(12) United States Patent (10) Patent No.: US 12,085,987 B2
Zhu et al. (45) Date of Patent: Sep. 10, 2024

(54) DISPLAY METHOD AND ELECTRONIC DEVICE

(71) Applicant: Huawei Technologies Co., Ltd., Shenzhen (CN)

(72) Inventors: Dengkui Zhu, Shenzhen (CN); Hao Chen, Shenzhen (CN); Aihua Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 17/682,805

(22) Filed: Feb. 28, 2022

(65) Prior Publication Data

US 2022/0179455 A1 Jun. 9, 2022

Related U.S. Application Data

(63) Continuation of application No. PCT/CN2020/105276, filed on Jul. 28, 2020.

(30) Foreign Application Priority Data

Aug. 30, 2019 (CN) .......................... 201910818036.3

(51) Int. Cl.
*G06F 1/16* (2006.01)
*G06F 3/0488* (2022.01)
*G06F 9/451* (2018.01)

(52) U.S. Cl.
CPC .......... *G06F 1/1641* (2013.01); *G06F 1/1616* (2013.01); *G06F 1/1626* (2013.01);
(Continued)

(58) Field of Classification Search
CPC .. G06F 3/0481; G06F 3/0482; G06F 3/04886; G06F 1/1616; G06F 2203/04803;
(Continued)

(56) References Cited

U.S. PATENT DOCUMENTS 8,988,381 B1 3/2015 Kim et al.
9,137,195 B2 * 9/2015 Du ..................... H04Q 11/0067
(Continued)

FOREIGN PATENT DOCUMENTS

CN 103258491 A 8/2013
CN 103270505 A 8/2013
(Continued)

OTHER PUBLICATIONS

Ngc360, "The folding screen mobile phone is here, and it is a mobile Internet cafe with a cloud computer," total 20 pages, https://www.dalongyun.com/article-610-1.html. (Nov. 14, 2018). With English translation.

(Continued)

*Primary Examiner* — Dismery Mercedes
(74) *Attorney, Agent, or Firm* — Leydig, Voit & Mayer, Ltd.

(57) ABSTRACT

A display method applied to an electronic device having a foldable screen includes: in response to the foldable screen being in a folded state, the electronic device controls the foldable screen to display a first interface of a first application, where the first interface is a cloud desktop interface of a first operating system; and in response to the foldable screen changing from the folded state to an unfolded state, the electronic device controls the foldable screen to simultaneously display the first interface and a second interface of a second operating system loaded by the electronic device.

20 Claims, 23 Drawing Sheets

(52) U.S. Cl.
CPC .......... *G06F 1/1652* (2013.01); *G06F 3/0488*
(2013.01); *G06F 9/451* (2018.02); *G09G*
*2380/02* (2013.01)

(58) Field of Classification Search
CPC .... G06F 1/1641; G06F 1/1677; G06F 3/0488;
G06F 3/041; G06F 1/1652; G06F 1/1626;
G06F 9/451; G06F 9/45; G09G 2354/00;
G09G 2380/02; G09G 3/035
See application file for complete search history.

(56) References Cited

U.S. PATENT DOCUMENTS

| | | | | |
|---|---|---|---|---|
| 9,678,810 | B2* | 6/2017 | Reeves | G06F 9/44505 |
| 2005/0093868 | A1 | 5/2005 | Hinckley | |
| 2010/0050111 | A1 | 2/2010 | Duffy | |
| 2013/0027364 | A1* | 1/2013 | Kim | G06F 1/1647 |
| | | | | 345/204 |
| 2014/0218321 | A1* | 8/2014 | Lee | G06F 1/1643 |
| | | | | 345/173 |
| 2015/0185980 | A1* | 7/2015 | An | G06F 3/0484 |
| | | | | 715/803 |
| 2015/0346931 | A1* | 12/2015 | Moran | G06F 9/5077 |
| | | | | 715/740 |
| 2015/0378557 | A1* | 12/2015 | Jeong | G06F 1/1652 |
| | | | | 715/835 |
| 2017/0017454 | A1* | 1/2017 | Kim | G06F 3/04845 |
| 2017/0371509 | A1* | 12/2017 | Jung | G06F 3/0482 |
| 2018/0018753 | A1* | 1/2018 | McLaughlin | G06F 1/1626 |
| 2019/0042066 | A1 | 2/2019 | Kim et al. | |
| 2019/0370056 | A1* | 12/2019 | Yoo | G06F 3/04842 |
| 2020/0133337 | A1* | 4/2020 | Sirpal | G06F 3/04886 |
| 2021/0064191 | A1* | 3/2021 | Liao | G06F 3/04845 |

FOREIGN PATENT DOCUMENTS

| | | |
|---|---|---|
| CN | 104536715 A | 4/2015 |
| CN | 109766154 A | 5/2019 |
| CN | 109862258 A | 6/2019 |
| CN | 109871147 A | 6/2019 |
| CN | 109947298 A | 6/2019 |
| CN | 109981839 A | 7/2019 |
| CN | 110012154 A | 7/2019 |
| CN | 110032844 A | 7/2019 |
| CN | 110119261 A | 8/2019 |
| CN | 110147192 A | 8/2019 |
| CN | 110727486 A | 1/2020 |

OTHER PUBLICATIONS

Liu Xiaohui et al., "Network Management Tools Complete Technical Treasure Classic Edition," total 7 pages (2015). With English abstract.

"Series H: Audiovisual and Multimedia Systems Infrastructure of audiovisual services—Coding of moving video, High efficiency video coding," H.265(Oct. 2014), total 540 pages, International Telecommunication Union, Geneva, Switzerland (Oct. 2014).

Huawei terminal, "Professionals look here! EMUI10 multi-screen collaboration greatly improves your work efficiency," total 16 pages (Aug. 29, 2019).

Wang Jianping, "Network security and management," total 10 pages (2008). With English abstract.

* cited by examiner (a)

(b)

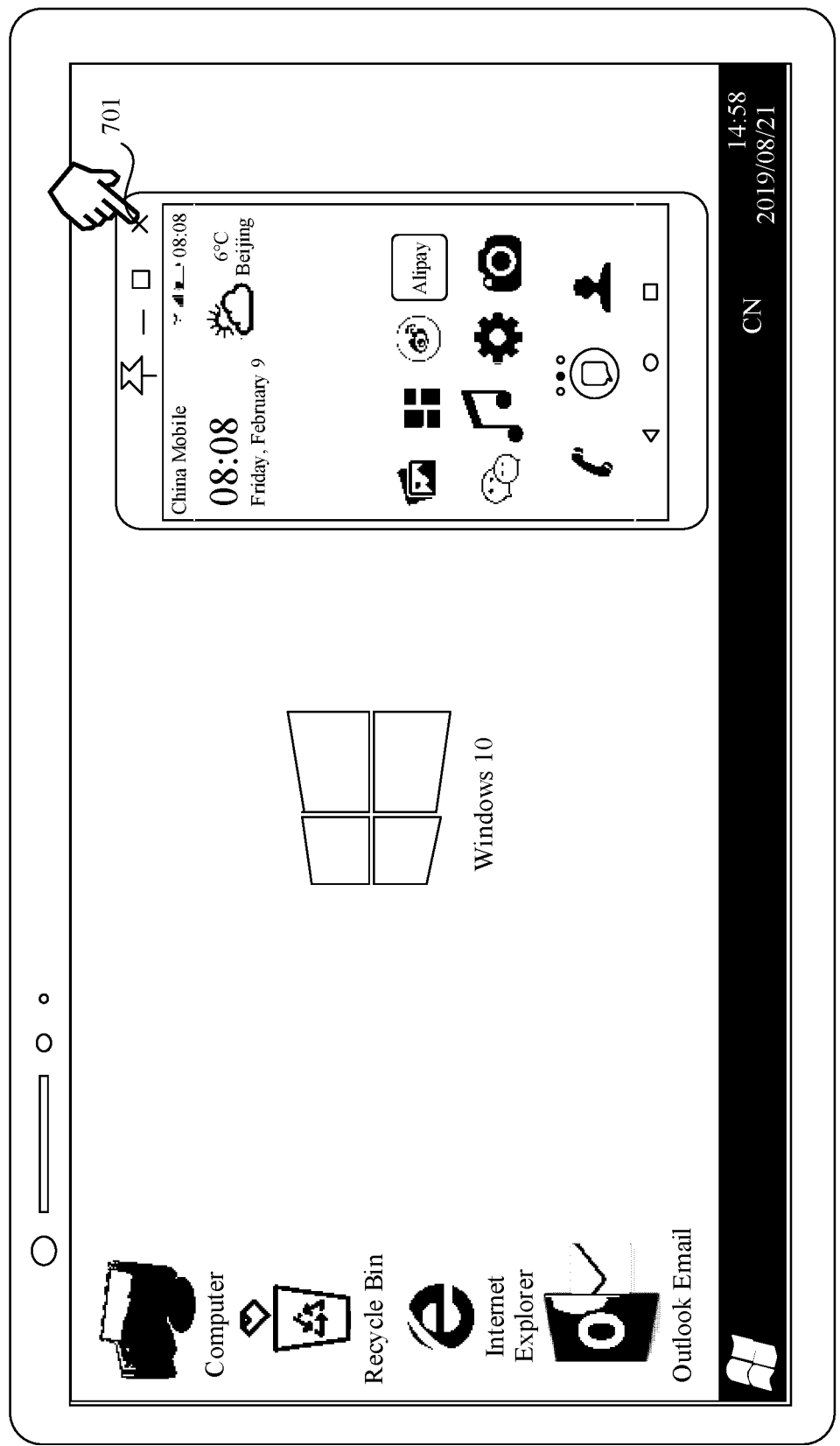

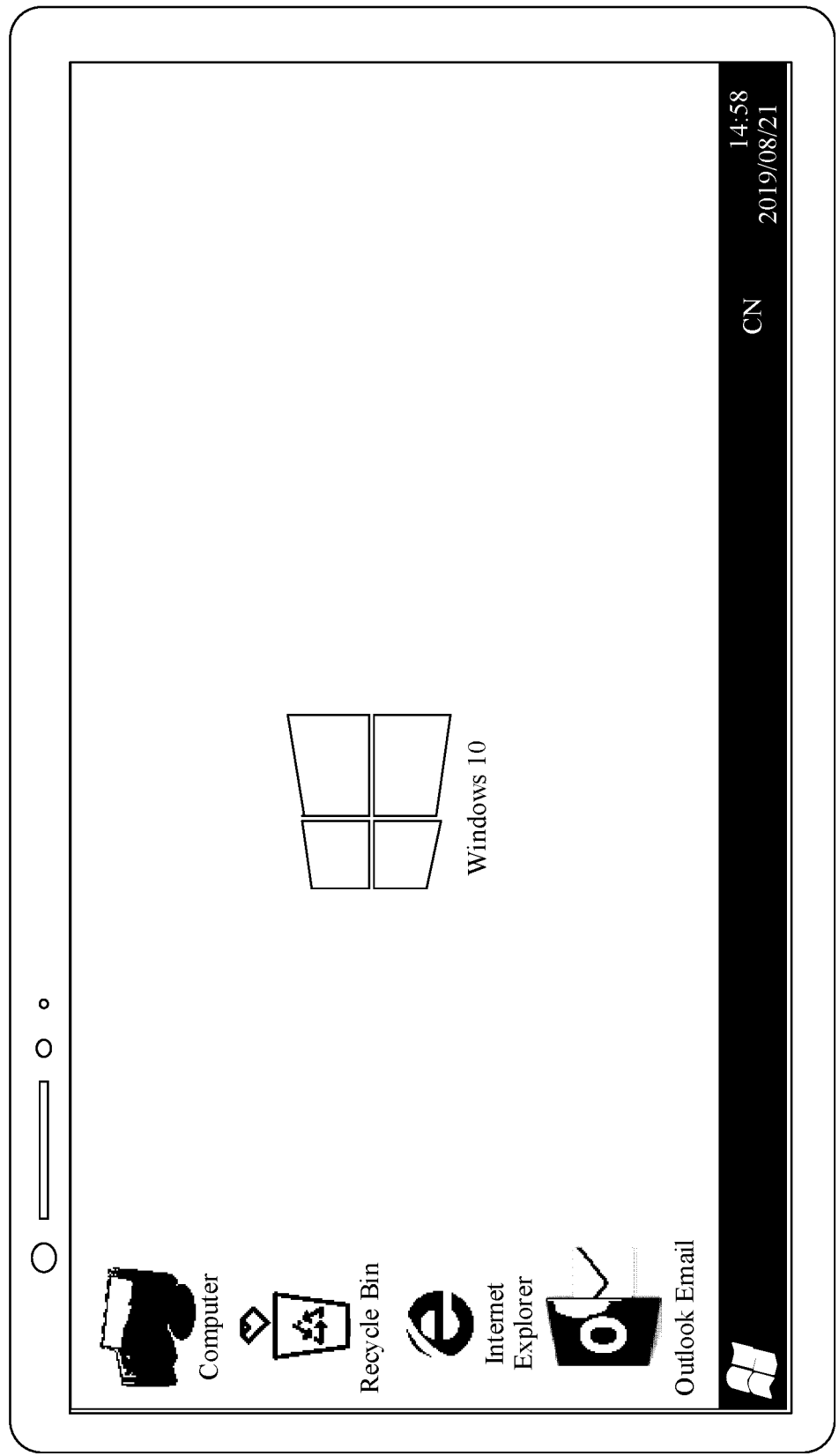
FIG. 7C-(b)

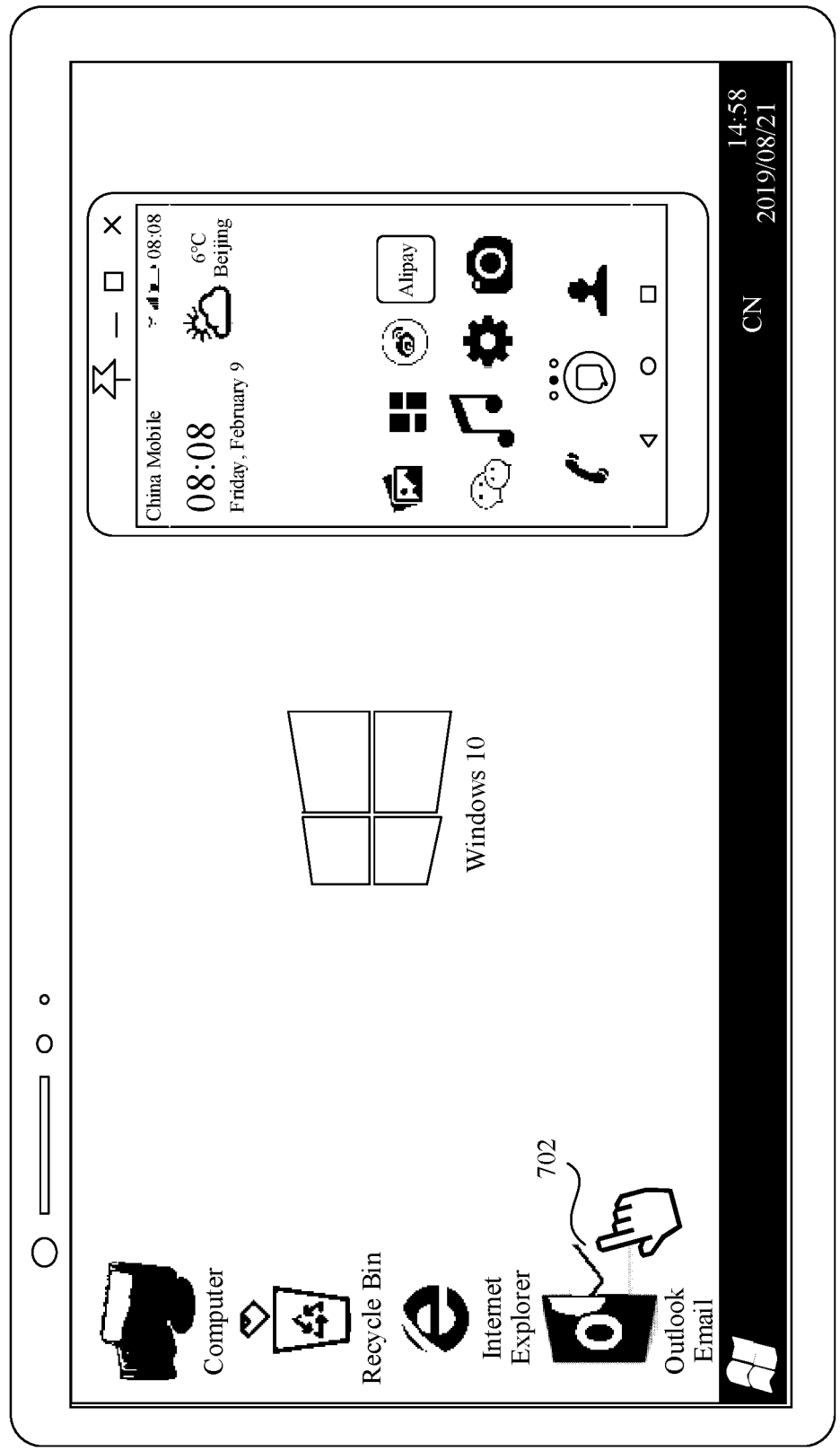
FIG. 7D-(a)

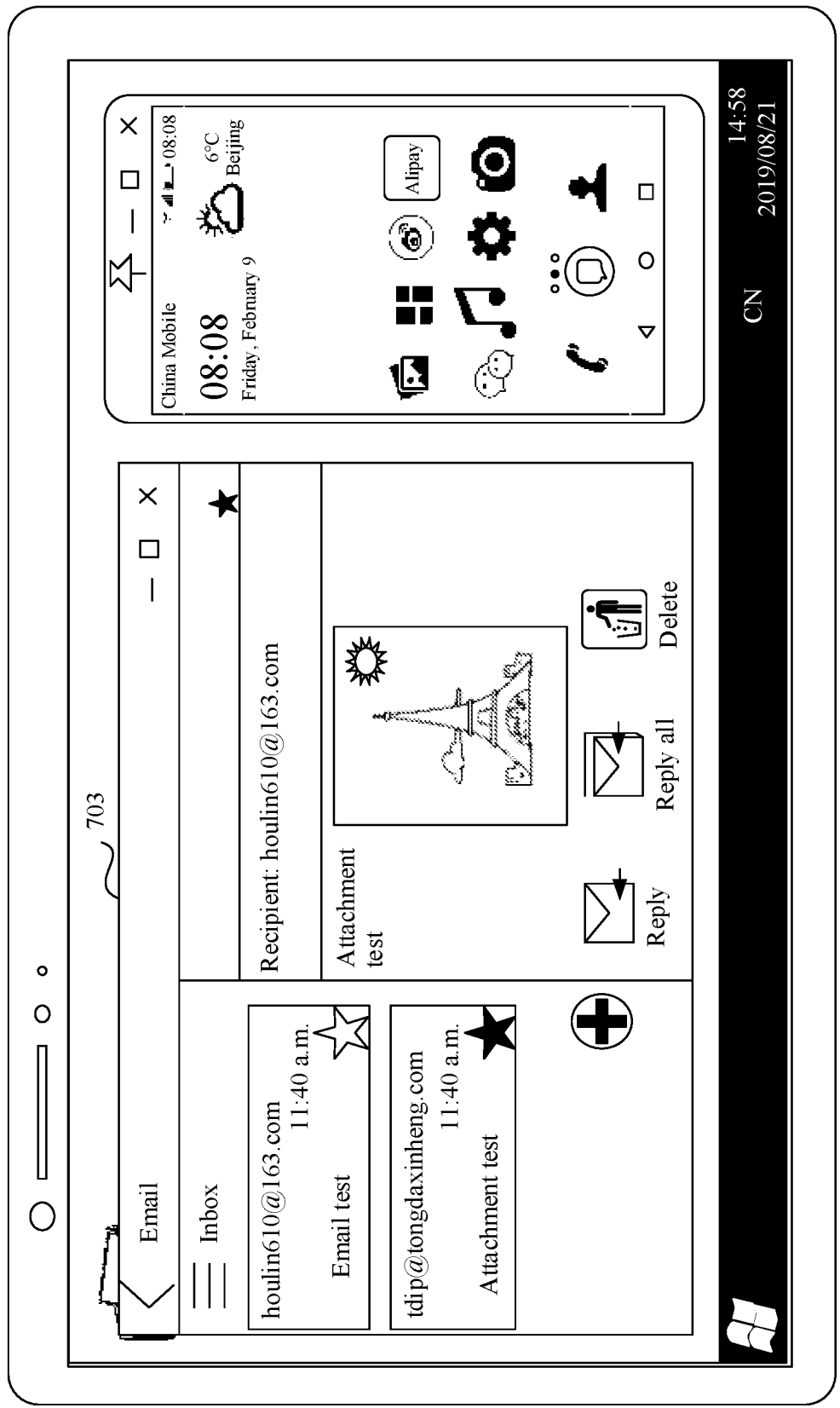
FIG. 7D-(b)

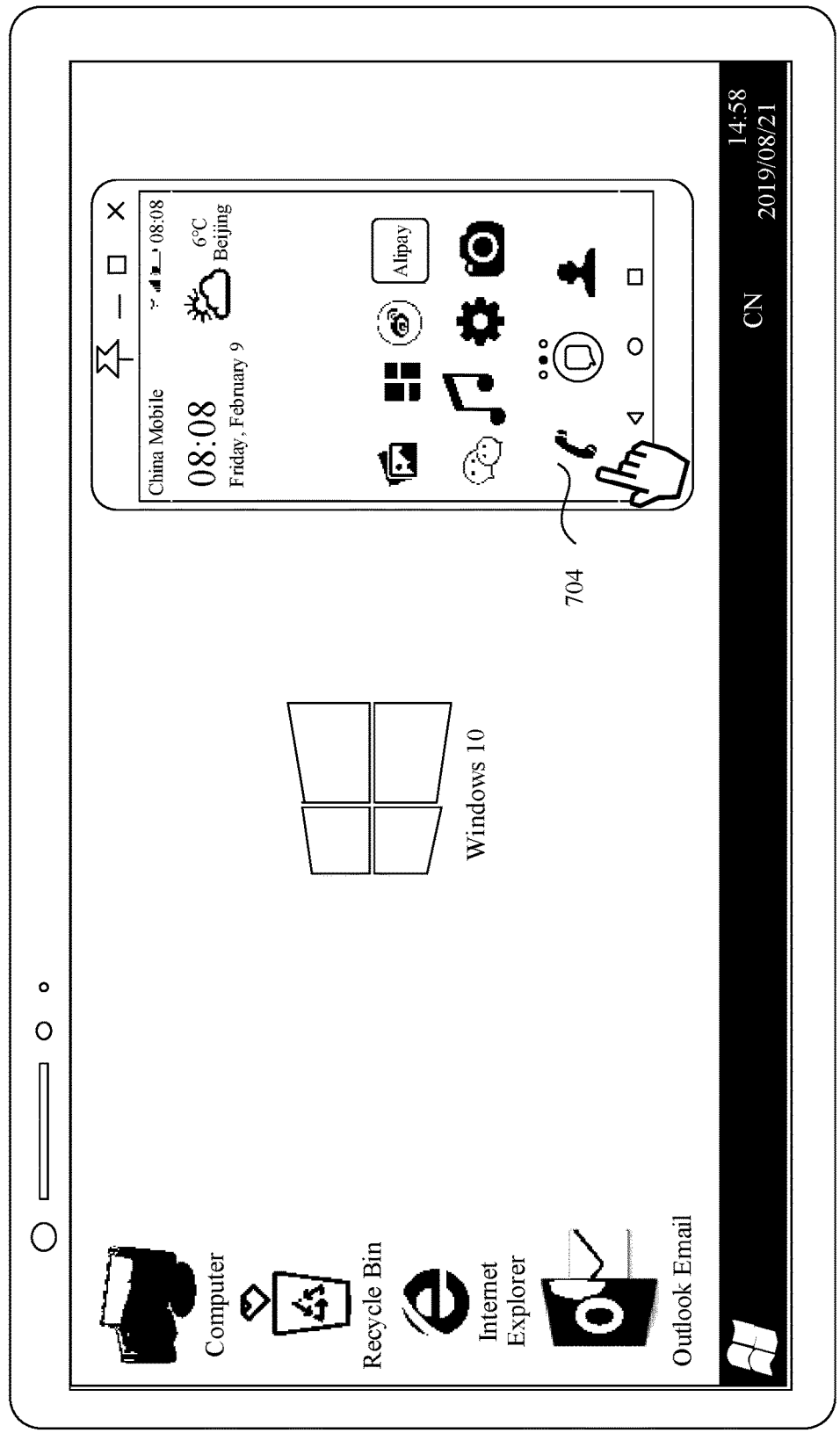
FIG. 7E-(a) TO FIG. 7E-(b)

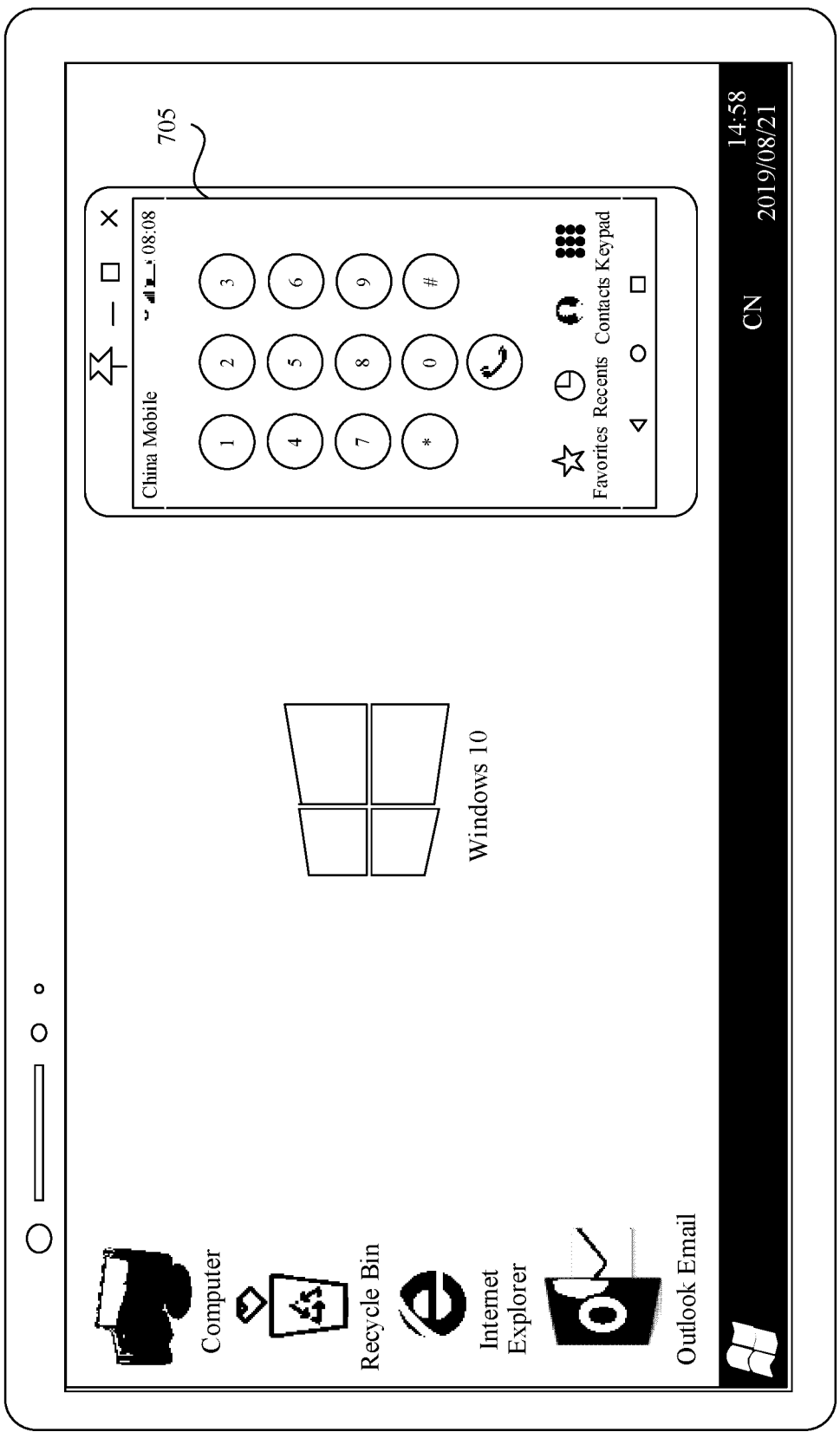
FIG. 7E-(b)

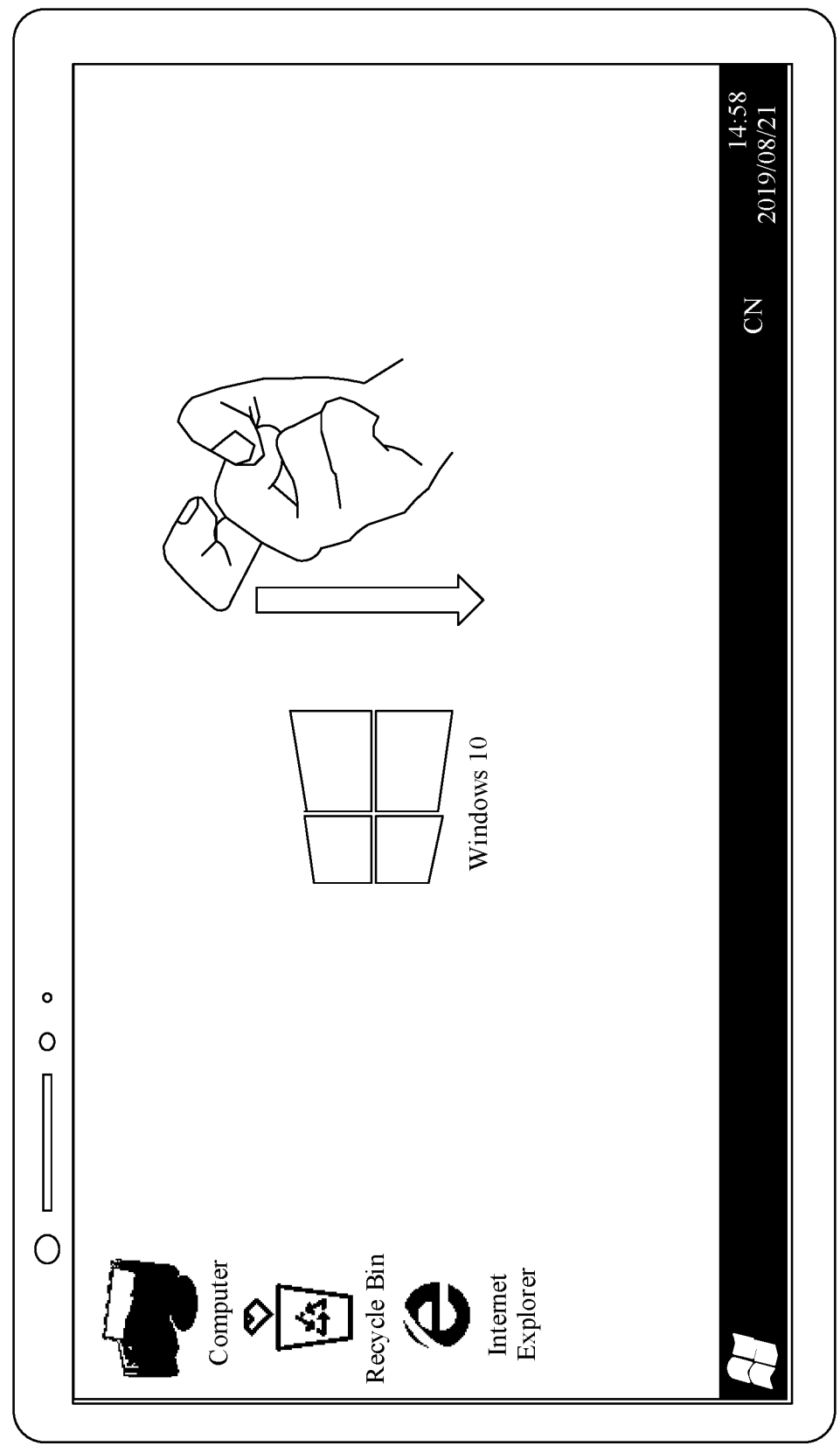

DISPLAY METHOD AND ELECTRONIC DEVICE

CROSS-REFERENCE TO RELATED APPLICATIONS

This application is a continuation of International Application No. PCT/CN2020/105276, filed on Jul. 28, 2020, which claims priority to Chinese Patent Application No. 201910818036.3, filed on Aug. 30, 2019. The disclosures of the aforementioned applications are hereby incorporated by reference in their entireties.

TECHNICAL FIELD

This application relates to the field of terminal technologies, and in particular, to a display method and an electronic device.

BACKGROUND

In a computer, a desktop cloud includes a desktop cloud client (also referred to as a thin client) and a desktop cloud virtual machine. The desktop cloud client may be a thin terminal that has only a display and is connected to a keyboard and a mouse, or may be an ordinary computer, an iPad, an Android tablet, a smartphone, or the like. The desktop cloud virtual machine transfers a virtualized cloud desktop interface to the desktop cloud client by using a desktop protocol. When the desktop cloud client displays the cloud desktop interface on a display, the desktop cloud client transfers related keyboard and mouse operations of a user to the desktop cloud virtual machine in real time by using the desktop protocol, and the desktop cloud virtual machine processes the related operations. In this way, the user can use a cloud desktop on a local terminal device in the way the user uses a local desktop.

In the current technology, when the user runs a desktop cloud application program on a terminal device (for example, a mobile phone), an interface displayed on a display of the terminal device is a cloud desktop interface (usually an interface of a Windows or Linux operating system). If the user is to view content of another application in the mobile phone, the current desktop cloud application program has to be exited (or the desktop cloud application program runs in the background). In this case, if the user is to view information such as a mobile phone short message service (SMS) message or a WeChat message while using the cloud desktop for work, inconvenience is caused, and user experience is affected.

SUMMARY

A display method and an electronic device are provided in this application. In the method, a user can view received information of the electronic device in time when using a cloud desktop for work, which improves user experience.

According to a first aspect, this application provides a display method, applied to an electronic device having a foldable screen. The method includes: when the foldable screen is in a folded state, the electronic device displays a first interface of a first application, where the first interface is a cloud desktop interface of a first operating system; and in response to the foldable screen changing from the folded state to an unfolded state, the electronic device controls the foldable screen to simultaneously display the first interface and a second interface, where the second interface is an interface of a second operating system loaded by the electronic device.

In embodiments of this application, when the foldable screen is fully unfolded, the electronic device may simultaneously display a cloud desktop and the interface of the second operating system loaded by the electronic device, so that the user can view information received by a mobile phone anytime and anywhere while using a mobile phone cloud desktop for work, which simplifies operation steps for the user, and improves convenience of using the cloud desktop.

In a possible design, a display manner is: the electronic device controls the foldable screen to display the first interface in full screen; and controls the second interface to be displayed in the first interface in a window form.

In the embodiments of this application, the interface of the second operating system loaded by the electronic device is displayed on the display in the window form, so that the user can conveniently perform an operation, for example, open or close. A position of the window can be moved, and the interface has good aesthetics.

In a possible design, a first display area of the foldable screen is controlled to display the first interface; and a second display area of the foldable screen is controlled to display the second interface.

In the embodiments of this application, interfaces of different operating systems are displayed in different display areas of the display, so that the user can view displayed content of a corresponding operating system in time.

In a possible design, location information of the first display area and the second display area on the foldable screen is preconfigured in the electronic device; or location information of the first display area and the second display area on the foldable screen is set by the user in the electronic device; or the first display area is a display area corresponding to a first screen, and the second display area is a display area corresponding to a second screen, where the foldable screen includes the first screen and the second screen.

In the embodiments of this application, displayed content of the foldable screen can be enriched, utilization of the foldable screen can be improved, and visual experience of the user can be improved.

In a possible design, the electronic device receives a drag operation performed by the user on displayed content in the second interface, and copies the displayed content to the first interface in response to the drag operation; or the electronic device receives a drag operation performed by the user on displayed content in the first interface, and copies the displayed content to the second interface in response to the drag operation.

In the embodiments of this application, the user can drag and move displayed content in the interfaces corresponding to the different operating systems, which improves convenience of information obtaining and copying, and helps the user obtain useful information in time.

In a possible design, the first operating system is Windows or Linux, and the second operating system is Android or iOS.

According to a second aspect, an embodiment of this application further provides a display method. The method may be applied to an electronic device that does not have a foldable screen. The method includes: displaying, on a display of the electronic device, a first interface of a first application, where the first interface is a cloud desktop interface of a first operating system; and receiving, by a processor of the electronic device, a first operation; and in response to the first operation, controlling the display of the electronic device to simultaneously display the first interface and an interface of a second operating system loaded by the electronic device.

In embodiments of this application, when the display receives the first operation, the electronic device may simultaneously display a cloud desktop and the interface of the second operating system loaded by the electronic device, so that a user can view information received by a mobile phone anytime and anywhere while using a mobile phone cloud desktop for work, which simplifies operation steps for the user, and improves convenience of using the cloud desktop.

In a possible design, a display manner is: the electronic device controls the foldable screen to display the first interface in full screen; and controls a second interface to be displayed in the first interface in a window form.

In the embodiments of this application, the interface of the second operating system loaded by the electronic device is displayed on the display in the window form, so that the user can conveniently perform an operation, for example, open or close. A position of the window can be moved, and the interface has good aesthetics.

In a possible design, a first display area of the foldable screen is controlled to display the first interface; and a second display area of the foldable screen is controlled to display the second interface.

In the embodiments of this application, interfaces of different operating systems are displayed in different display areas of the display, so that the user can view displayed content of a corresponding operating system in time.

In a possible design, the electronic device receives a drag operation performed by the user on displayed content in the second interface, and copies the displayed content to the first interface in response to the drag operation; or the electronic device receives a drag operation performed by the user on displayed content in the first interface, and copies the displayed content to the second interface in response to the drag operation.

In the embodiments of this application, the user can drag and move displayed content in the interfaces corresponding to the different operating systems, which improves convenience of information obtaining and copying, and helps the user obtain useful information in time.

According to a third aspect, an embodiment of this application provides an electronic device, including a sensor, a touchscreen, a processor, and a memory, where the memory is configured to store one or more computer programs. When the one or more computer programs stored in the memory are executed by the processor, the electronic device can implement the method according to any possible design of any one of the foregoing aspects.

According to a fourth aspect, an embodiment of this application further provides an apparatus. The apparatus includes modules/units for performing the method according to any possible design of any one of the foregoing aspects. These modules/units may be implemented by hardware, or may be implemented by hardware executing corresponding software.

According to a fifth aspect, an embodiment of this application further provides a computer-readable storage medium. The computer-readable storage medium includes a computer program, and when the computer program is run on an electronic device, the electronic device is enabled to perform the method according to any possible design of any one of the foregoing aspects According to a sixth aspect, an embodiment of this application further provides a computer program product. When the computer program product runs on a terminal, an electronic device is enabled to perform the method according to any possible design of any one of the foregoing aspects.

These aspects or other aspects of this application will be described in details in the following descriptions of the embodiments.

BRIEF DESCRIPTION OF DRAWINGS

FIG. 7A to FIG. 7E-(b) are schematic diagrams of a group of interfaces according to an embodiment of this application;

DESCRIPTION OF EMBODIMENTS

For ease of understanding, exemplary descriptions of some concepts related to the embodiments of this application are provided for reference.

(1) Application program may be referred to as application (APP) for short, and is a software program that can implement one or more specific functions. Usually, a plurality of applications may be installed on an electronic device, for example, an instant messaging application, a video application, an audio application, an image shooting application, and a cloud desktop application. The instant messaging application may be, for example, a Message application, WeChat, WhatsApp Messenger, LINE, Instagram, Kakao Talk, and DingTalk. The image shooting application may include, for example, a Camera application (a system camera or third-party camera application). The video application may include, for example, YouTube, Twitter, TikTok, iQIYI, and Tencent Video. The audio application may include, for example, KuGou, EMUMO, and QQ music. An application mentioned in the following embodiments may be a system application installed before delivery of an electronic device, or may be a third-party application downloaded from a network or obtained from another electronic device by a user in a process of using the electronic device.

Figure 1:
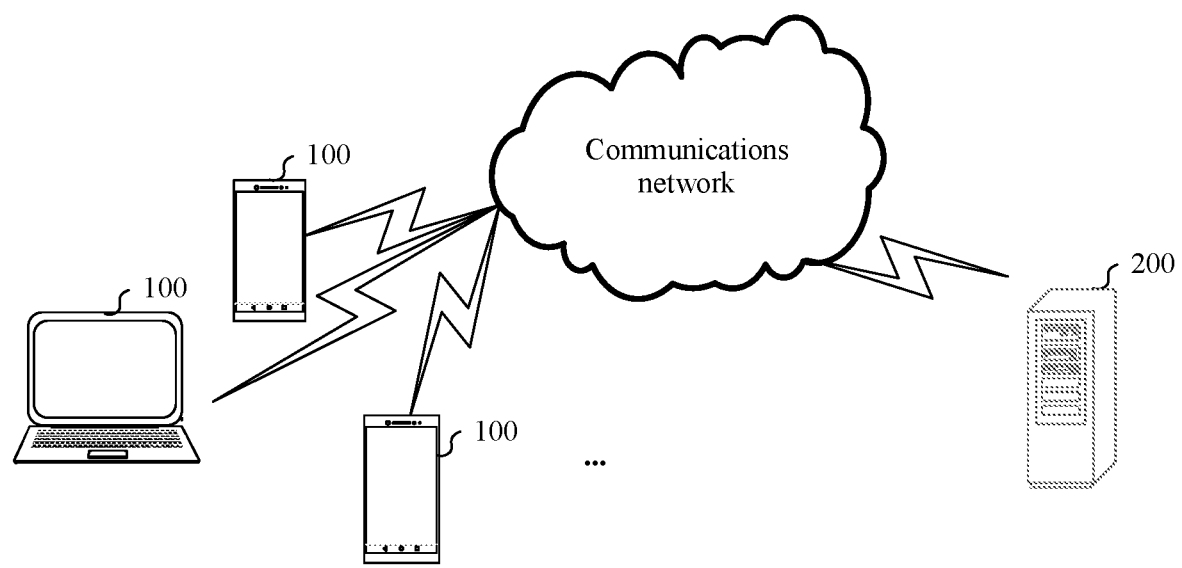
FIG. 1 is a schematic diagram of an application scenario according to an embodiment of this application.

The display method provided in the embodiments of this application may be applied to electronic devices 100 shown in FIG. 1. In FIG. 1, the electronic devices 100 may communicate with a server 200 by using a communications network, and the electronic devices 100 may communicate with each other by using the communications network. In the embodiments of this application, an electronic device 100 may be a desktop cloud client, and the server 200 may be a desktop cloud virtual machine.

The communications network may be a local area network, or may be a wide area network for transferring through a relay device, or may include a local area network and a wide area network. For example, when the communications network is the local area network, the communications network may be a short-range communications network such as a Wi-Fi hotspot network, a Wi-Fi P2P network, a Bluetooth network, a zigbee network, or a near field communication (NFC) network. For example, when the communications network is the wide area network, the communications network may be a 3rd generation wireless telephone technology (3G) network, a 4th generation mobile communication technology (4G) network, a 5th generation mobile communication technology (5G) network, a future evolved public land mobile network (PLMN), or the Internet.

In some embodiments of this application, the electronic device 100 shown in FIG. 1 may be a portable electronic device, such as a mobile phone, a foldable mobile phone, a tablet, or a wearable device (such as a smartwatch) with a wireless communications function. The portable electronic device includes, but is not limited to a portable electronic device using iOS®, Android®, Microsoft®, or another operating system. The portable electronic device may alternatively be another portable electronic device, for example, a laptop with a touch-sensitive surface (for example, a touch panel). It should be further understood that, in some other embodiments of this application, the electronic device 100 may not be a portable electronic device, but is a desktop computer having a touch-sensitive surface (for example, a touch panel).

Figure 2:
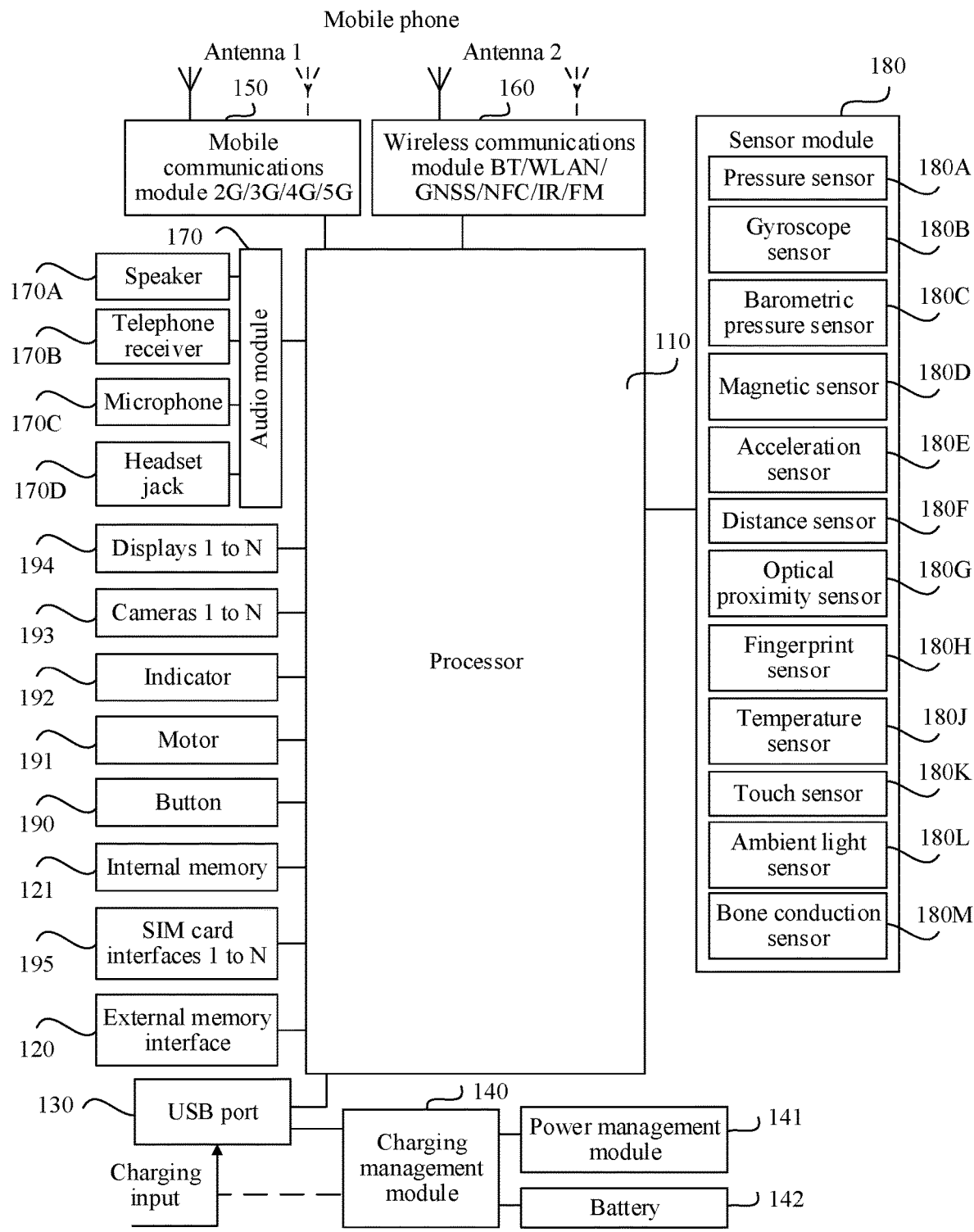
FIG. 2 is a schematic diagram of a structure of a foldable phone according to an embodiment of this application.

For example, the following embodiment is described mainly by using an example in which the electronic device 100 is a mobile phone. FIG. 2 is a schematic diagram of a structure of the mobile phone.

As shown in FIG. 2, the mobile phone may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the mobile phone. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110, which improves system efficiency.

The USB port 130 is an interface that conforms to a USB standard specification, and may be specifically a mini USB port, a micro USB port, a USB Type C port, or the like. The USB port 130 may be configured to connect to a charger to charge the mobile phone, or may be configured to transmit data between the mobile phone and a peripheral device. The charging management module 140 is configured to receive a charging input from the charger. The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communications function of the mobile phone may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the mobile phone may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communications solution that includes 2G/3G/4G/5G or the like and that is applied to the mobile phone. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The wireless communications module 160 may provide a wireless communications solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the mobile phone. The wireless communications module 160 may be one or more components integrating at least one communications processing module. The wireless communications module 160 receives an electromagnetic wave through the antenna 2, performs processing such as frequency modulation and filtering on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 of the mobile phone are coupled, and the antenna 2 and the wireless communications module 160 of the mobile phone are coupled, so that the mobile phone can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application, and the like. The display 194 includes a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-OLED, quantum dot light emitting diodes (QLED), or the like. In some embodiments, the mobile phone may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer-executable program code. The executable program code includes instructions. The processor 110 runs the instructions stored in the internal memory 121, to execute various function applications of the mobile phone and data processing. The internal memory 121 may include a program storage area and a data storage area. The program storage area may store an operating system, software code of at least one application (such as an iQIYI application or a WeChat application), and the like. The data storage area may store data (for example, an image and a video) and the like generated in a process of using the mobile phone. In addition, the internal memory 121 may include a high-speed random access memory, and may further include a nonvolatile memory, for example, at least one magnetic disk storage device, a flash storage device, or a universal flash storage (UFS).

The external memory interface 120 may be configured to connect to an external storage card such as a micro SD card, to extend a storage capability of the mobile phone. The external storage card communicates with the processor 110 through the external memory interface 120, to implement a data storage function. For example, a file such as an image or a video is stored in the external storage card.

The mobile phone may implement an audio function such as music playing or recording by using the audio module 170, the speaker 170A, the telephone receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a moving posture of the mobile phone. In some embodiments, angular velocities of the mobile phone around three axes (namely, x, y, and z axes) may be determined by using the gyroscope sensor 180B.

The gyroscope sensor 180B may be configured to perform image stabilization during photographing. The barometric pressure sensor 180C is configured to measure barometric pressure. In some embodiments, the mobile phone calculates an altitude by using the barometric pressure measured by the barometric pressure sensor 180C, to assist in positioning and navigation. The magnetic sensor 180D includes a Hall sensor. The mobile phone may detect opening and closing of a flip cover by using the magnetic sensor 180D. In some embodiments, when the mobile phone is a clamshell phone, the mobile phone may detect opening and closing of a clamshell by using the magnetic sensor 180D. Further, a feature such as automatic unlocking upon opening of the flip cover is set based on a detected opening or closing state of the flip cover or a detected opening or closing state of the clamshell. The acceleration sensor 180E may detect values of acceleration in various directions (usually on three axes) of the mobile phone. When the mobile phone is still, a value and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The mobile phone may measure a distance through infrared light or a laser. In some embodiments, in a photographing scenario, the mobile phone may measure a distance by using the distance sensor 180F, to implement fast focusing. The optical proximity sensor 180G may include, for example, a light-emitting diode (LED) and an optical detector such as a photodiode. The light-emitting diode may be an infrared light-emitting diode. The mobile phone emits infrared light by using the light-emitting diode. The mobile phone detects reflected infrared light from a nearby object by using the photodiode. When sufficient reflected light is detected, the mobile phone may determine that there is an object near the mobile phone. When insufficient reflected light is detected, the mobile phone may determine that there is no object near the mobile phone. The mobile phone may detect, by using the optical proximity sensor 180G, that the user holds the mobile phone close to an ear to make a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The mobile phone may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the mobile phone is in a pocket to prevent an accidental touch. The fingerprint sensor 180H is configured to collect a fingerprint. The mobile phone may use a feature of the collected fingerprint to implement fingerprint unlocking, application access locking, fingerprint photographing, fingerprint call answering, and the like.

The temperature sensor 180J is configured to detect a temperature. In some embodiments, the mobile phone executes a temperature processing policy based on the temperature detected by the temperature sensor 180J. For example, when the temperature reported by the temperature sensor 180J exceeds a threshold, the mobile phone lowers performance of a processor near the temperature sensor 180J, to reduce power consumption for thermal protection. In some other embodiments, when the temperature is less than another threshold, the mobile phone heats the battery 142 to prevent the mobile phone from an abnormal shutdown caused by a low temperature. In some other embodiments, when the temperature is less than still another threshold, the mobile phone boosts an output voltage of the battery 142 to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile phone and is at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal.

The button 190 includes a power button, a volume button, and the like. The button 190 may be a mechanical button, or may be a touch button. The mobile phone may receive a button input, and generate a button signal input related to a user setting and function control of the mobile phone. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or plugged from the SIM card interface 195, to implement contact with or separation from the mobile phone.

It may be understood that the components shown in FIG. 1 do not constitute a specific limitation on the mobile phone. The mobile phone may further include more or fewer components than those shown in the figure, or combine some components, or split some components, or have different component arrangements. The components shown in the figure may be implemented by using hardware, software, or a combination of software and hardware.

Figure 3A:
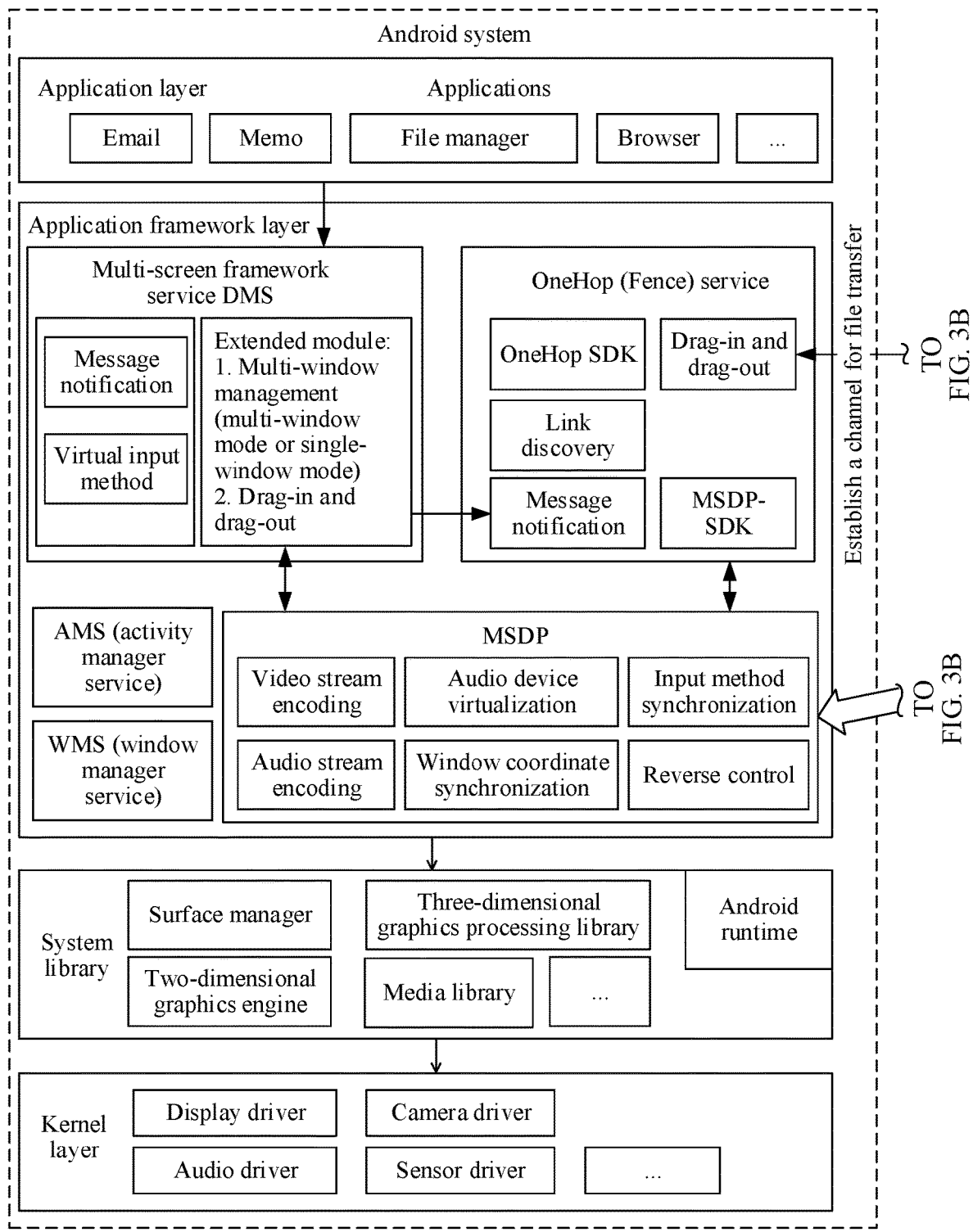
FIG. 3A and FIG. 3B are a schematic diagram of a software system according to an embodiment of this application.
Figure 3B:
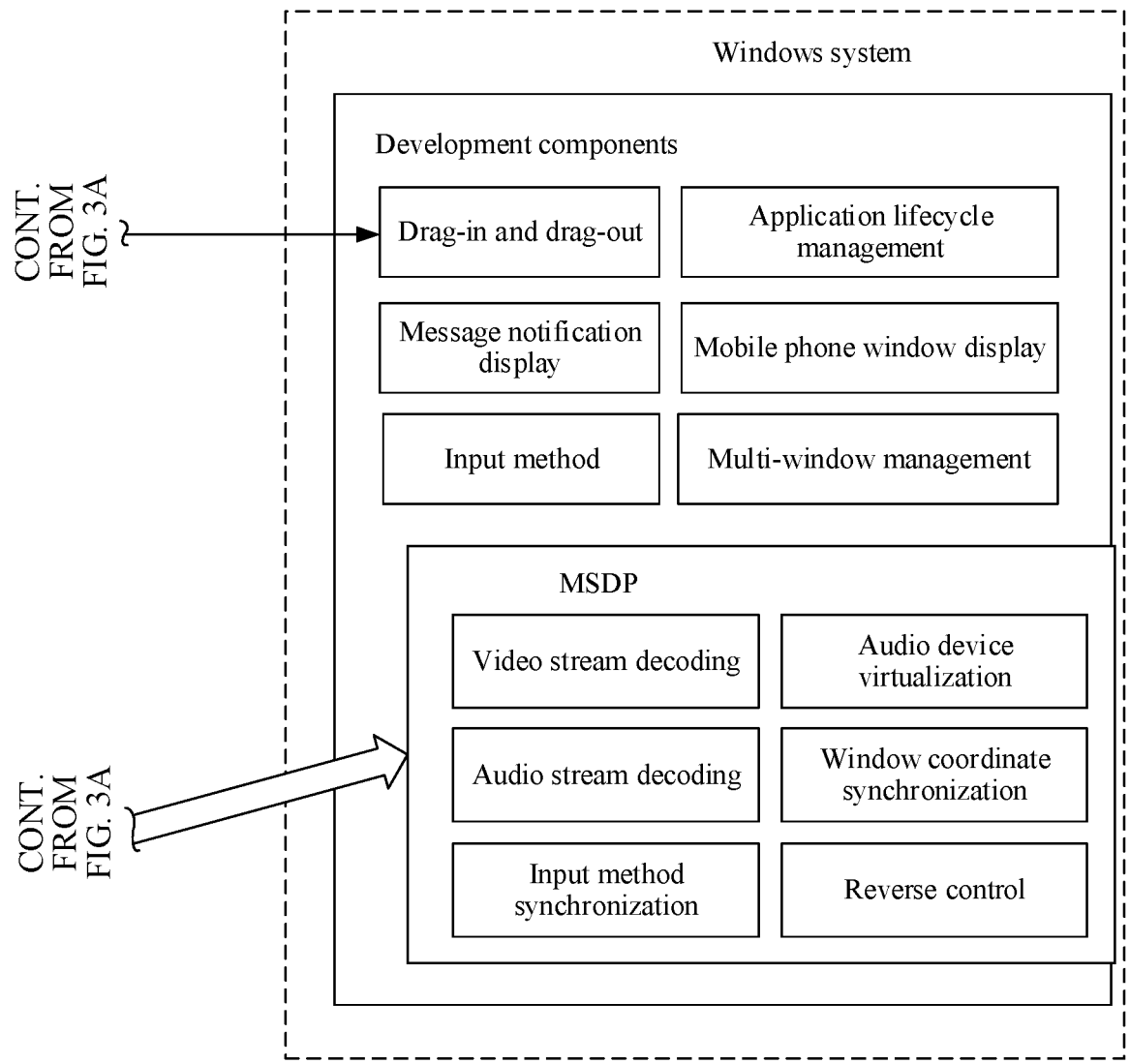

FIG. 3A and FIG. 3B are a block diagram of a software structure of an electronic device 100 according to an embodiment of this application. As shown in FIG. 3A and FIG. 3B, a first operating system of the electronic device 100 may be a Windows system, and a second operating system may be an Android system. A software structure of the Android system may be a hierarchical architecture. For example, software may be divided into several layers, and each layer has a clear role and responsibility. The layers communicate with each other through a software interface. In some embodiments, the Android system is divided into four layers: an application layer, an application framework (FWK) layer, an Android runtime and system library, and a kernel layer from top to bottom.

The application layer may include a series of application packages. As shown in FIG. 3A and FIG. 3B, the application layer may include Email, Memo, File manager, Browser, other third-party applications, and the like. The third-party applications may include Huawei cloud computer, WeChat, QQ, Gallery, Calendar, Call, Map, Navigation, WLAN, Bluetooth, Music, Video, Message, and the like.

The application framework layer provides an application programming interface (API) and a programming framework for an application at the application layer. The application framework layer may include some predefined functions. As shown in FIG. 3A and FIG. 3B, the application framework layer may include a multi-screen framework service (DMS), a OneHop (fence) service, a window manager service (WMS), an activity manager service (AMS), and a multicast source discovery protocol (MSDP). Optionally, the application framework layer may further include a content provider, a view system, a telephony manager, a resource manager, a notification manager, and the like (not shown in FIG. 3A and FIG. 3B).

The multi-screen framework service (DMS) is used to implement message notification, a virtual input method, drag-in and drag-out of displayed content between the Android system and the Windows system, and the like. In addition, the multi-screen framework service is used to implement a window mode and application collaboration lifecycle management.

The OneHop (fence) service is used to discover links, implement drag-in and drag-out of the displayed content, invoke a software package (SDK) of the MSDP, and the like. Specifically, the OneHop (fence) service is used to: parse and distribute network transmission content, where data is obtained from a cloud desktop virtual machine, parsed into a text or a file, injected into a system through an invoked WMS interface, and distributed to an application; and listen to and temporarily store mobile phone drag content, where a WMS registration interface is invoked to listen to a drag-out event, and when the event is dragged out, a callback registration interface obtains the data and sends the data to the cloud desktop virtual machine.

The window manager service (WMS) is used to manage a window program. The window manager service may obtain a size of a display, determine whether there is a status bar, perform screen locking, take a screenshot, and the like.

The activity manager service (AMS) is responsible for managing an activity, starting, switching, and scheduling components in a system, managing and scheduling applications, and the like.

The MSDP is mainly used in encoding, decoding, and reverse control of a video stream transmitted at a bottom layer. Specifically, the MSDP classifies the transmitted data into, for example, an application intent (starting, closing, moving, or scaling an application), a window coordinate, an input string, and an audio/video stream. The MSDP is integrated in the Android operating system and the Windows system for information transmission.

In addition, an application framework layer of the Windows system of the electronic device further loads a development component configured to implement the foregoing display method. The development component mainly implements: network transmission management: establishing and managing a network transmission channel for receiving and sending drag content; injecting text or file data into the system; and listening to a Windows drag event, obtaining drag content, and invoking an interface to send data to a mobile phone.

The Android runtime includes a kernel library and a virtual machine. The Android runtime is responsible for scheduling and management of the Android system. The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, such as a surface manager, a media library (media libraries), a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playback and recording of audio and video in a plurality of commonly used formats, static image files, and the like. The media library may support a plurality of audio and video coding formats, for example, MPEG4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, a sensor driver, an input/output device driver (for example, a keyboard, a touchscreen, a headset, a speaker, and a microphone), and the like.

With reference to the display method in the embodiments of this application, the following describes, by example, working procedures of software and hardware of a foldable mobile phone.

In an example, the electronic device receives an unfold operation (for example, switching from a folded state to an unfolded state) performed by the user on the display. The sensor driver at the kernel layer may generate a corresponding input event based on the unfold operation, and report the event to the application framework layer. The activity manager service AMS of the application framework layer sets a window mode (for example, a multi-window mode) corresponding to the input event, a window location, a window size, and the like. The window manager service WMS of the application framework layer draws a window based on a setting of the AMS, and then sends data of the drawn window to the display driver of the kernel layer. The display driver displays corresponding application interfaces in different display areas of the display.

The following describes the technical solutions in the embodiments of this application with reference to the accompanying drawings in the embodiments of this application. The terms "first" and "second" below in the descriptions of the embodiments of this application are merely used for a description purpose, and shall not be understood as an indication or implication of relative importance or implicit indication of a quantity of indicated technical features. Therefore, a feature limited by "first" or "second" may explicitly or implicitly include one or more such features. In the descriptions of the embodiments of this application, unless otherwise specified, "a plurality of" means two or more.

Figure 4A:
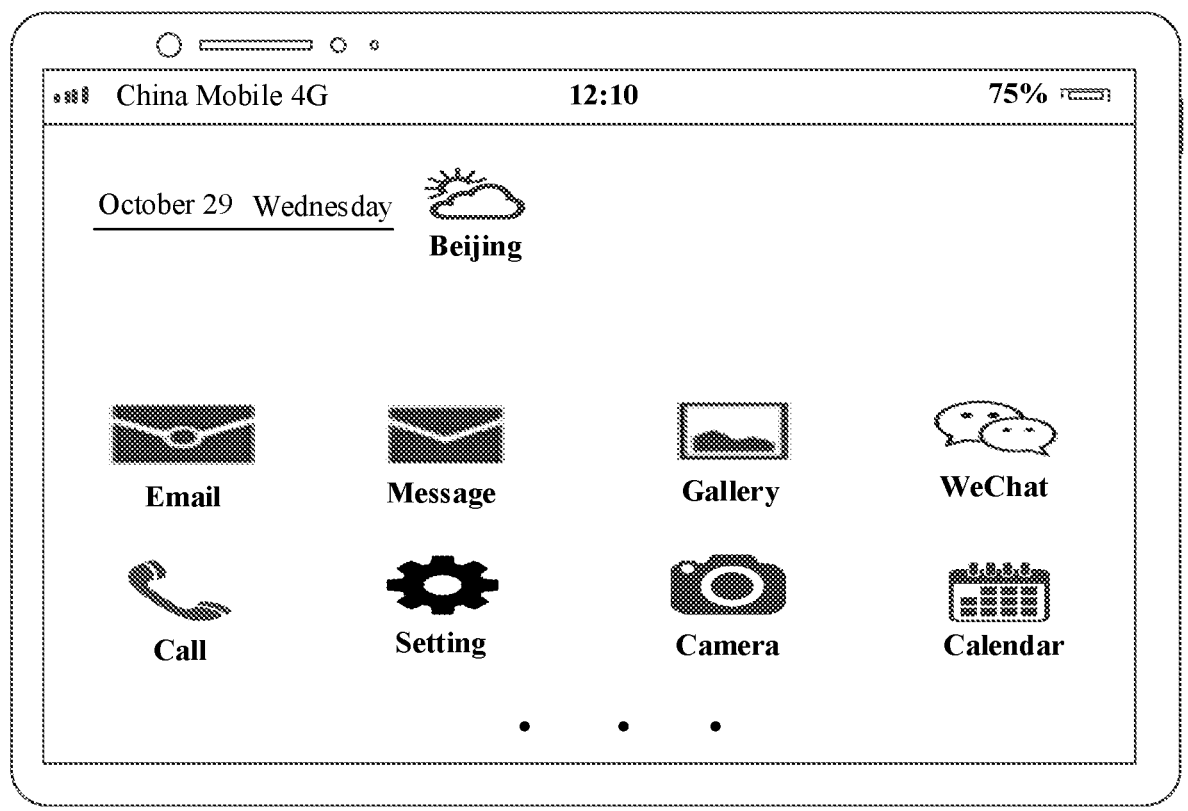
FIG. 4A and FIG. 4B are schematic diagrams of electronic devices according to an embodiment of this application.
Figure 4B:
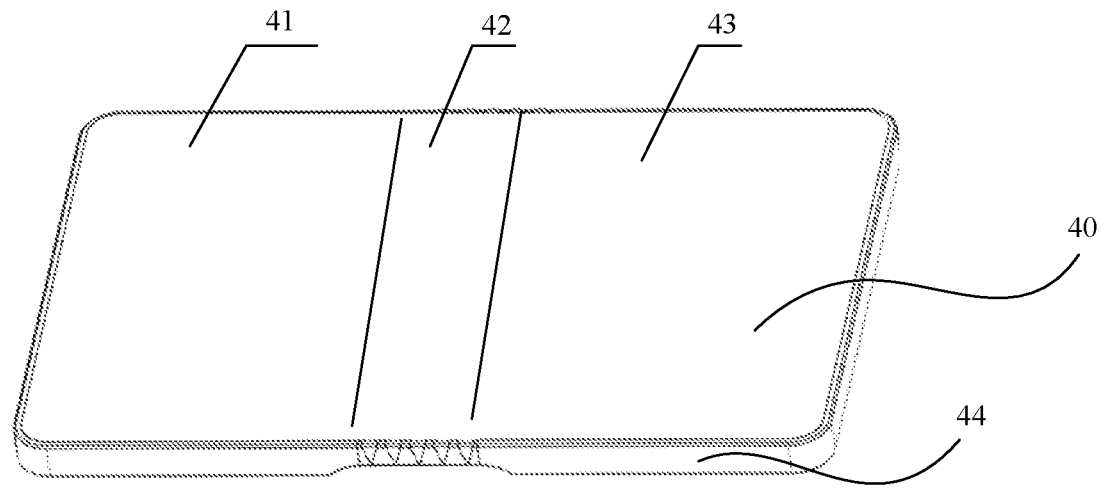
Figure 4B:
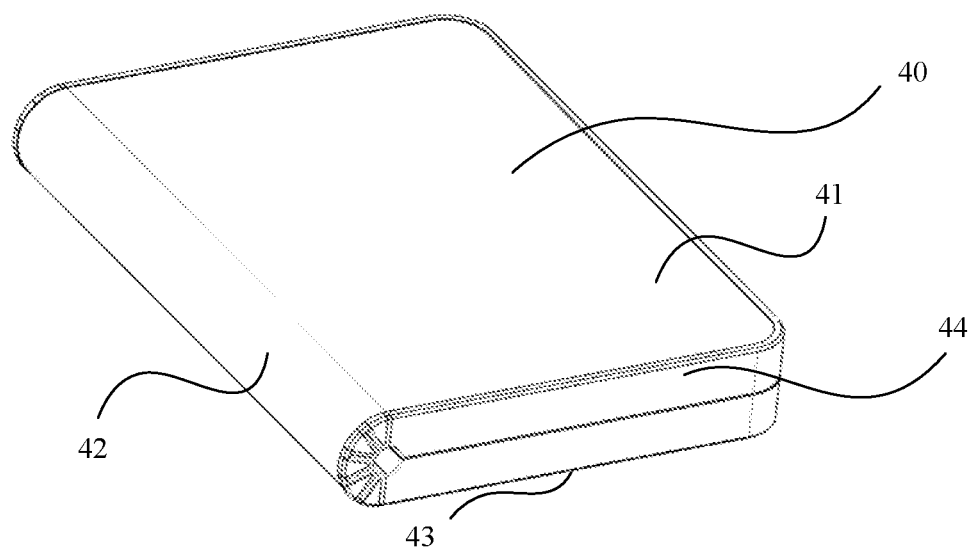

The display method provided in the embodiments of this application is applicable to widescreen devices shown in FIG. 4A and FIG. 4B. FIG. 4A shows a tablet device (pad) whose touchscreen is not foldable. FIG. 4B shows a foldable mobile phone, and the foldable mobile phone has a foldable touchscreen. FIG. 4B-(a) shows a shape of the mobile phone when the mobile phone is fully unfolded. FIG. 4B-(b) shows a shape of the mobile phone after the mobile phone is fully folded.

The foldable touchscreen provided in this embodiment of this application may be one integrated flexible display, or may be a display including two rigid screens and one flexible screen located between the two rigid screens. With reference to FIG. 4B, it is assumed that the foldable touchscreen provided in this embodiment of this application includes three parts: a first screen 41, a second screen 43, and a bendable area 42 that connects the first screen 41 and the second screen 43. When the foldable touchscreen of the mobile phone is unfolded, the first screen 41, the second screen 43, and the bendable area 42 are connected to form an integrated screen. A sensor module 180 detects that an included angle between the first screen 41 and the second screen 43 is 180 degrees (an actual angle may not reach 180 degrees; the actual angle prevails).

As shown in FIG. 4B-(a), when the mobile phone is unfolded, a housing 44 of the mobile phone is unfolded. At the same time, the foldable touchscreen 40 is also unfolded. As shown in FIG. 4B-(b), when the foldable touchscreen of the mobile phone is fully folded, the sensor module 180 detects that an included angle between the first screen 41 and the second screen 43 is 0 degrees (an actual angle may not reach 0 degrees; the actual angle prevails). When the mobile phone is folded, the housing 44 of the mobile phone is also folded. In addition, the foldable touchscreen 40 is also folded. This is a case in which the mobile phone is folded outward, that is, a case in which the display is exposed outside after the mobile phone is folded. It should be understood that the mobile phone may alternatively be folded inward. To be specific, after the mobile phone is folded, the display is folded and hidden inside, and the housing 44 is exposed outside.

In the embodiment shown in FIG. 4B, the foldable mobile phone may be folded vertically or horizontally. Regardless of being folded horizontally or vertically, the foldable mobile phone may include three physical forms, for example, a folded form, a semi-folded form, and an unfolded form. The folded form may be a form shown in FIG. 5B-(a).

Figure 5A:
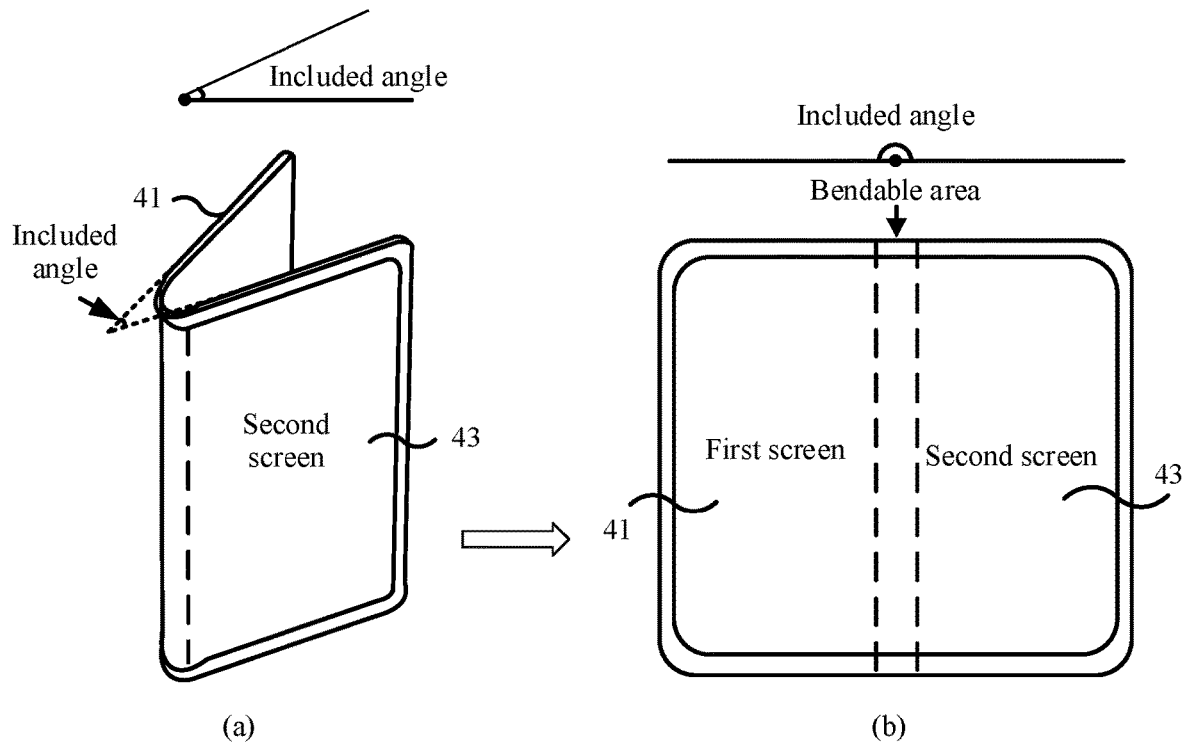
FIG. 5A and FIG. 5B are schematic diagrams of fold manners of an electronic device according to an embodiment of this application.

The semi-folded form may be a form shown in FIG. 5A-(a). The unfolded form may be a form shown in FIG. 5A-(b) and a form shown in FIG. 5B-(b).

Figure 6:
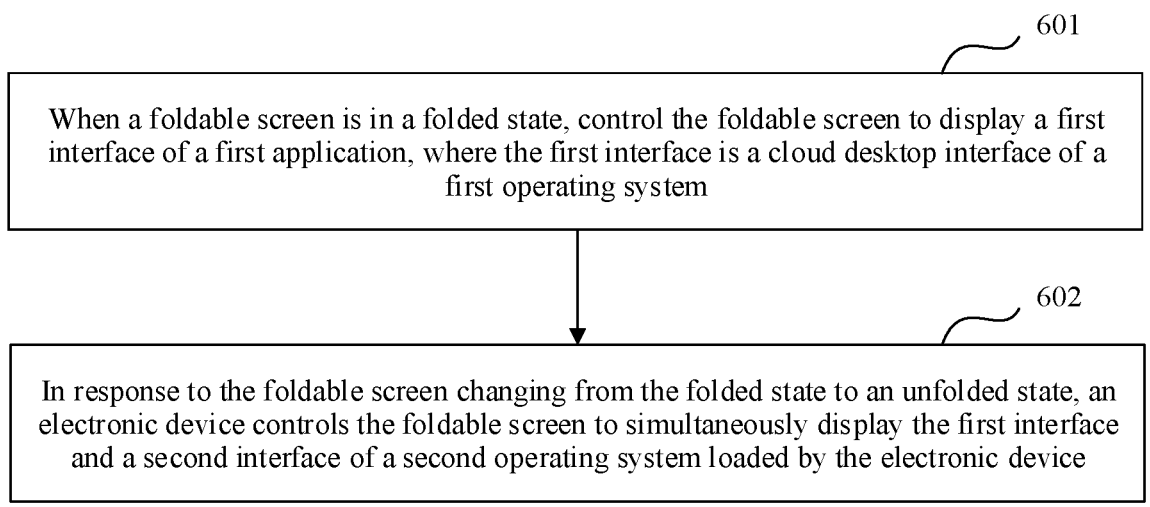
FIG. 6 is a schematic flowchart of a display method according to an embodiment of this application.

Based on a structure of the foregoing electronic device, an embodiment of this application provides a display method. As shown in FIG. 6, the method may be applied to the electronic device 100 in the communications system shown in FIG. 1, and the electronic device 100 may have a foldable screen.

Step 601: when the foldable screen is in a folded state, control the foldable screen to display a first interface of a first application, where the first interface is a cloud desktop interface of a first operating system. In this embodiment of this application, the first operating system may be any computer office system in Windows or Linux, and the first application may be a cloud desktop application.

Figure 5B:
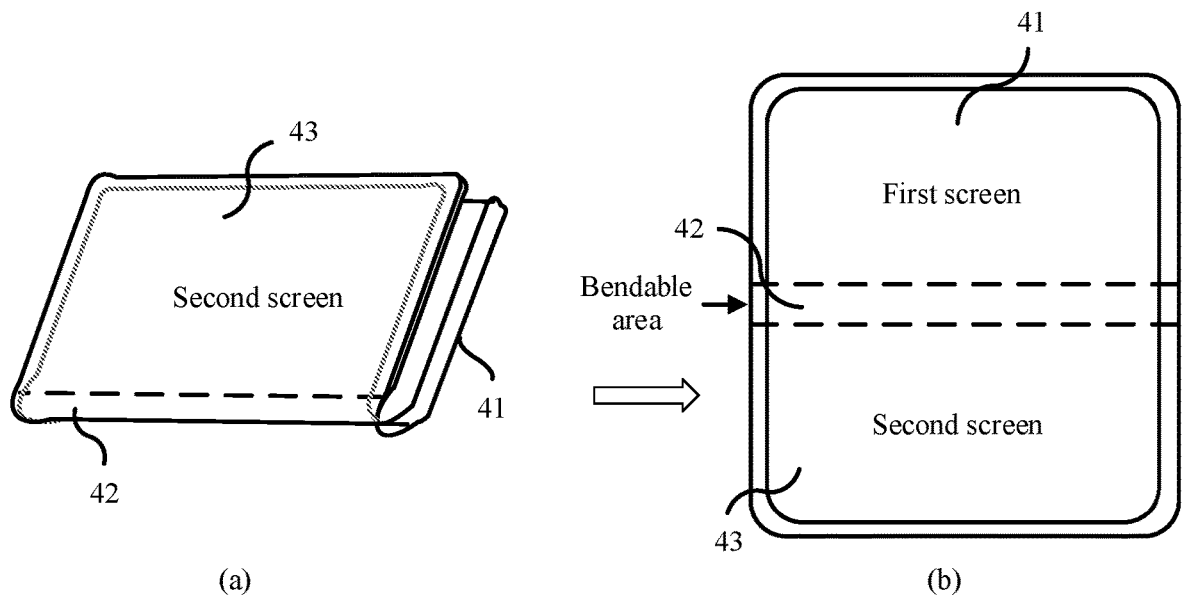

For example, as shown in FIG. 5A-(a), the foldable mobile phone is currently in the folded state, and the second screen 43 currently displays an image of a cloud desktop. For another example, as shown in FIG. 5B-(a), the foldable mobile phone is currently in the folded state, and the second screen 43 currently displays the cloud desktop interface.

Step 602: in response to the foldable screen changing from the folded state to an unfolded state, the electronic device controls the display in the unfolded state to display the first interface and a second interface of a second operating system loaded by the electronic device.

In this embodiment of this application, the second operating system may be either embedded device operating system: Android or iOS. For example, a user performs a vertical unfold operation on the foldable mobile phone shown in FIG. 5A-(a), and the foldable screen of the electronic device is fully unfolded, that is, a fully unfolded state shown in FIG. 5A-(b). For another example, the user performs a horizontal unfold operation on the foldable mobile phone shown in FIG. 5B-(a), and the foldable screen of the electronic device is fully unfolded, that is, a state shown in FIG. 5B-(b).

Figure 7A:
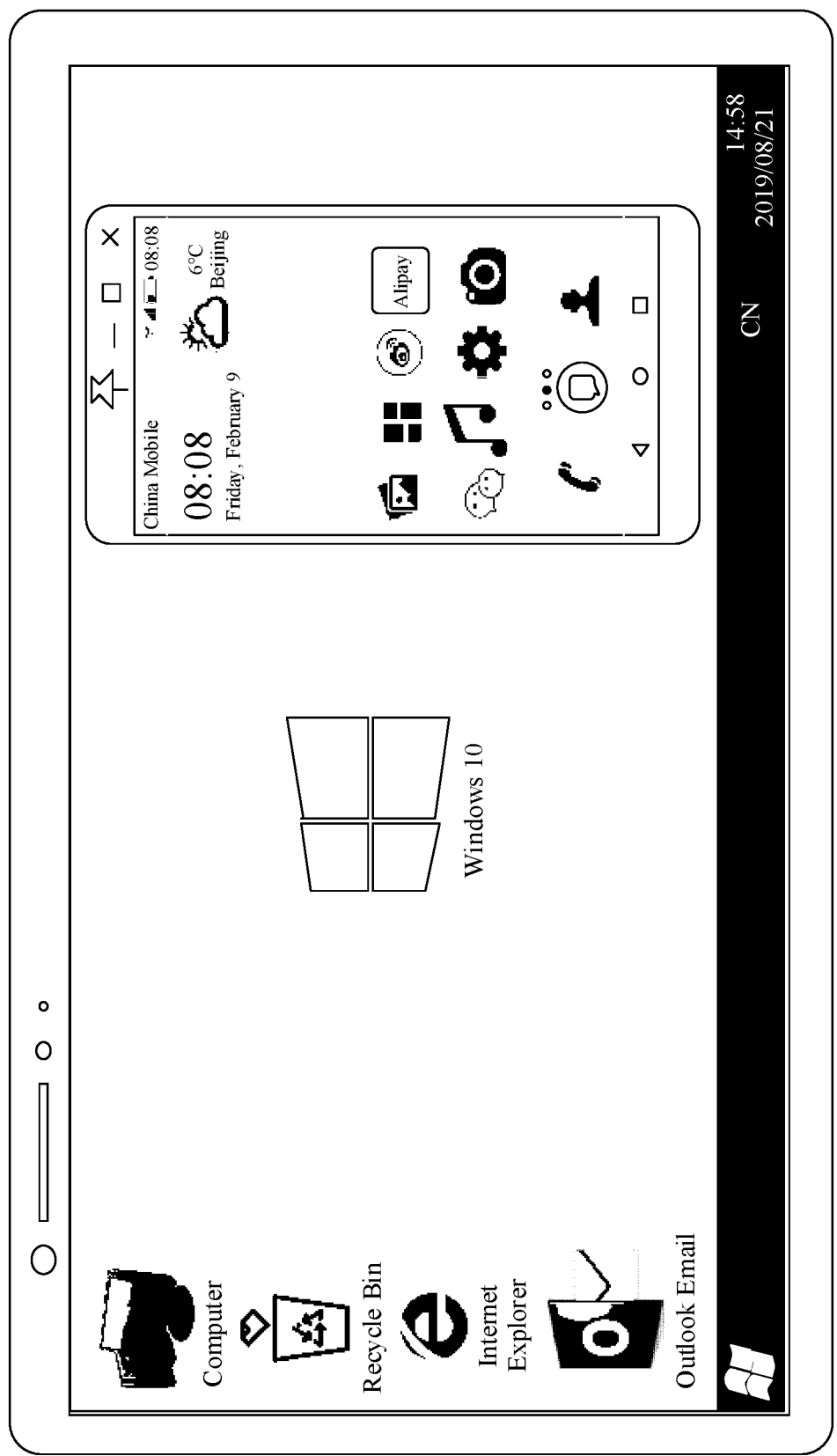
Figure 7B:
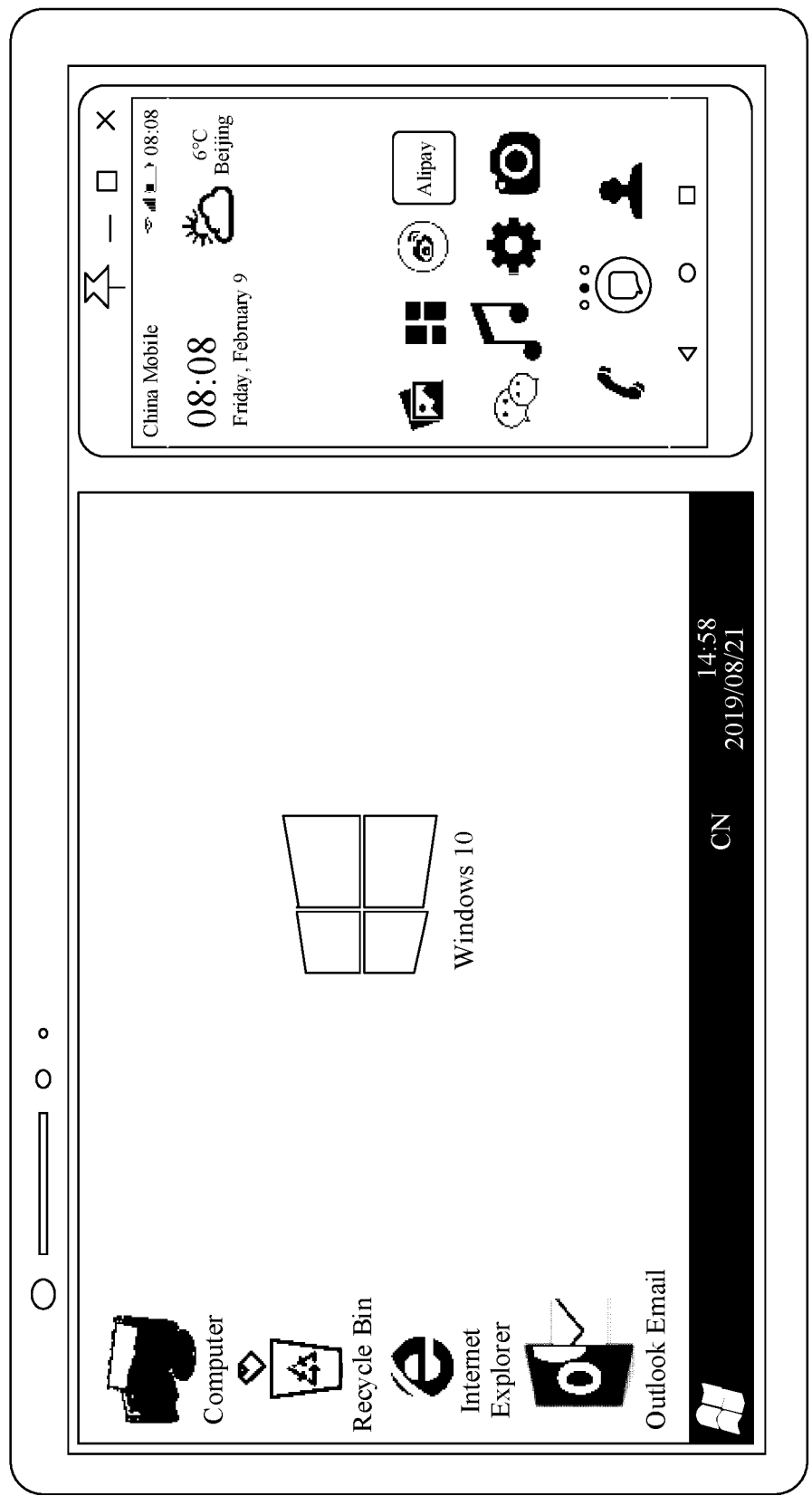

For example, the first operating system is the Windows system and the second operating system is an Android operating system. When the user changes the foldable mobile phone from the folded state to the fully unfolded state shown in FIG. 5A-(b) or FIG. 5B-(b), the electronic device may control the display in the unfolded state to display the first interface and the second interface in either of the following manners. A display manner may be as follows: The foldable mobile phone may display the first interface in full screen, that is, a cloud desktop interface of the Windows system, and control the second interface (that is, an interface of the Android operating system) to be displayed in the first interface in a "window" form, as shown in FIG. 7A. Another display manner may be as follows: the electronic device controls a first display area of the display in the unfolded state to display the first interface, that is, the cloud desktop interface of the Windows system, and controls a second display area of the display in the unfolded state to display the second interface (that is, the interface of the Android operating system), as shown in FIG. 7B.

In the embodiments of this application, in a possible embodiment, when the user places a focus on the second interface, the electronic device may close the interface of the second operating system in response to the operation of the user. For example, as shown in FIG. 7C-(a), when the electronic device detects a tap operation performed by the user on a control 701 in the second interface, in response to the operation, the electronic device displays an interface shown in FIG. 7C-(b), that is, the second interface is closed.

In a possible embodiment, when the user places the focus on the first interface, the electronic device may open or close a window of an application in the cloud desktop in response to an operation of the user, or respond to an input operation of the user. For example, as shown in FIG. 7D-(a), when the electronic device detects a tap operation performed by the user on a control 702 in the first interface, in response to the operation, the electronic device displays an interface shown in FIG. 7D-(b), where the cloud desktop interface includes a window 703 of an Outlook mailbox, that is, the Outlook mailbox of the Windows system is opened.

In another possible embodiment, when the user places the focus on the second interface, the electronic device may switch, in response to an operation of the user, an interface that displays an application. For example, as shown in FIG. 7E-(a), when the electronic device detects a tap operation performed by the user on a dialing icon control 704 in the second interface, in response to the operation, the electronic device displays an interface shown in FIG. 7E-(b), and the interface of the second operating system is a dialing interface, that is, a dialing application is opened.

It can be learned that, in this embodiment of this application, the user can view information received by the mobile phone anytime and anywhere while using the mobile phone cloud desktop for work, which simplifies operation steps for the user, and improves convenience of using the cloud desktop.

Figure 8:
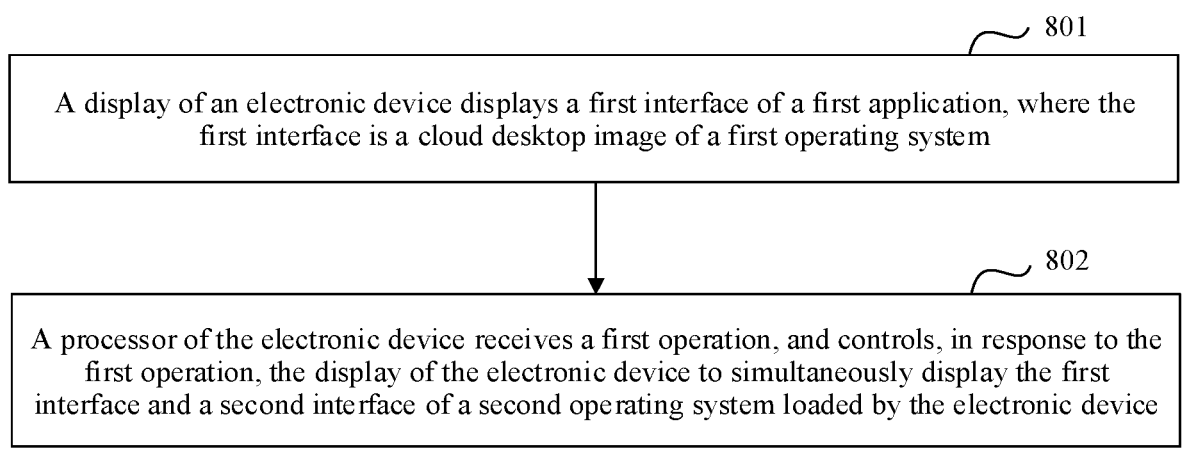
FIG. 8 is a schematic flowchart of a display method according to an embodiment of this application.

As shown in FIG. 8, an embodiment of this application further provides a display method. The method may also be applied to the electronic device 100 in the communications system shown in FIG. 1, and a display of the electronic device 100 may not be foldable.

Step 801: the display of the electronic device displays a first interface of a first application, where the first interface is a cloud desktop interface of a first operating system. In this embodiment of this application, the first operating system may be a computer office system such as Windows or Linux.

For example, as shown in FIG. 9(a), a foldable mobile phone currently displays a cloud desktop interface of a cloud computer APP.

Step 802: a processor 110 of the electronic device receives a first operation, and controls, in response to the first operation, the display of the electronic device to simultaneously display the first interface and a second interface of a second operating system loaded by the electronic device.

In this embodiment of this application, the second operating system may be either embedded device operating system: Android or iOS. For example, the first operation may be a screen split gesture shown in FIG. 9(a). In response to the screen split gesture, the electronic device displays an interface shown in FIG. 9(b). The interface includes both a cloud desktop of a Windows system and a desktop of an Android operating system. It should be noted that the first operation may alternatively be another gesture, for example, two taps, or a speech instruction. This is not limited in this embodiment of this application.

Figure 9B:
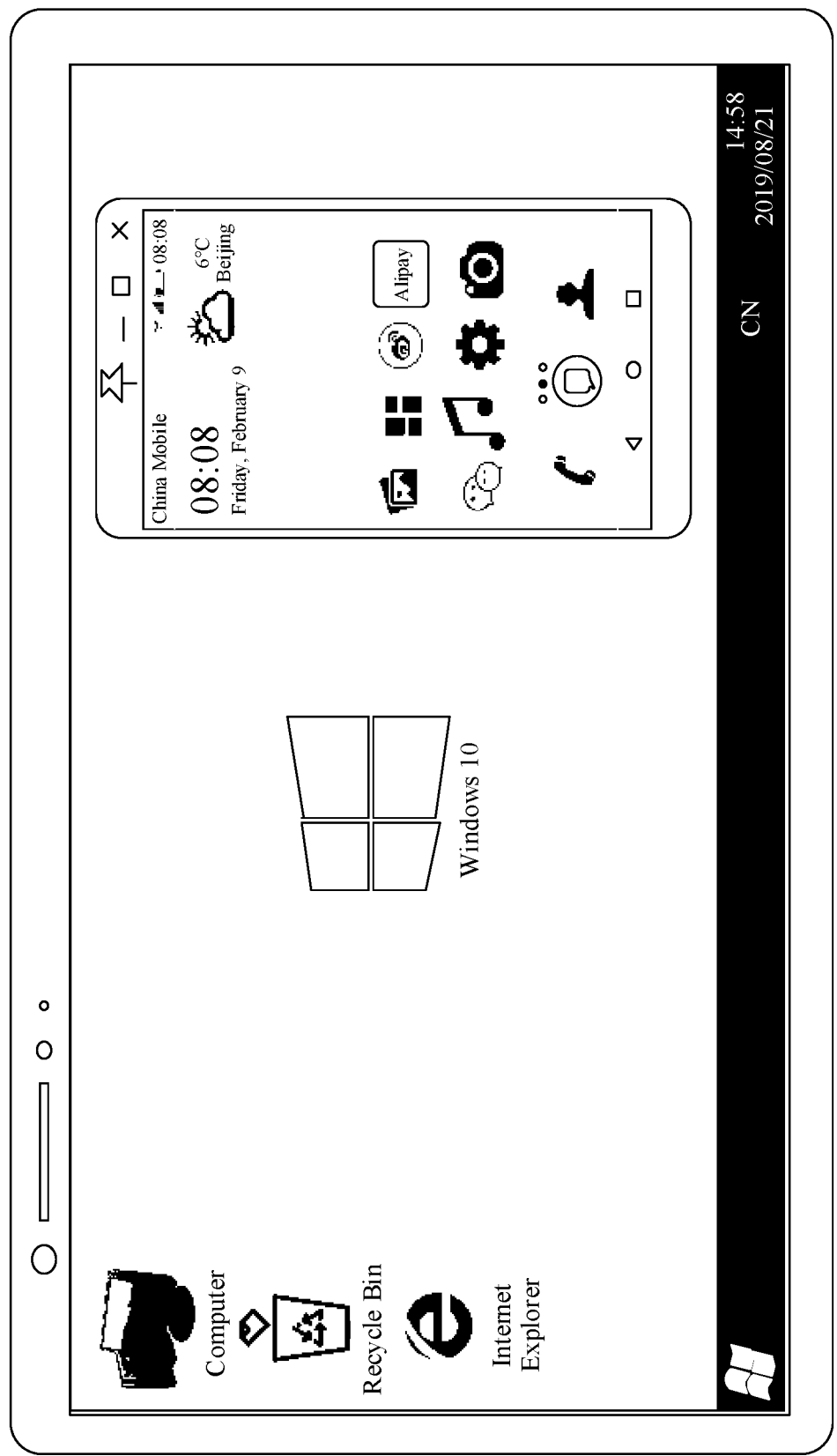
FIG. 9($a$) and FIG. 9($b$) are a schematic diagram of a group of interfaces according to an embodiment of this application.

In a possible embodiment, after the electronic device receives the first operation, the electronic device may control a display in the unfolded state to display the first interface and the second interface in either of the following manners. A display manner may be as follows: the display of the electronic device may display the first interface (that is, the cloud desktop of the Windows system) in full screen, and control the second interface (that is, an interface of the Android operating system) to be displayed in the first interface in a "window" form, as shown in FIG. 9(b).

Another display manner is as follows: the electronic device controls a first display area of the display in the unfolded state to display the first interface, that is, the cloud desktop of the Windows system, and controls a second display area of the display in the unfolded state to display the second interface (that is, the interface of the Android operating system), as shown in FIG. 7B.

In this embodiment of this application, when a user places a focus on the second interface, the electronic device may close the interface of the second operating system in response to an operation of the user. When the user places the focus on the first interface or the second interface, the electronic device may open or close an interface of an application in response to an operation of the user, or respond to an input operation of the user. For a specific example, refer to descriptions in FIG. 7B to FIG. 7E. Details are not described herein again. In this embodiment of this application, the user can view information received by the mobile phone anytime and anywhere while using the mobile phone cloud desktop for work, which simplifies operation steps for the user, and improves convenience of using the cloud desktop.

It should be noted that, for the display methods shown in FIG. 6 and FIG. 8, a plurality of display areas included in a display (a foldable screen or non-foldable screen) of the electronic device may be preset in the electronic device, or may be manually set by the user. In other words, sizes (including width and height) of the first display area and the second display area may be preconfigured in the mobile phone. Alternatively, the width and height of the first display area and the second display area may be manually set by the user in the mobile phone. In this embodiment, a size of the first display area and a size of the second display area may be the same or different. Optionally, when the display is a foldable screen, the first display area may be a display area corresponding to a first screen, and the second display area may be a display area corresponding to a second screen.

Figure 10A:
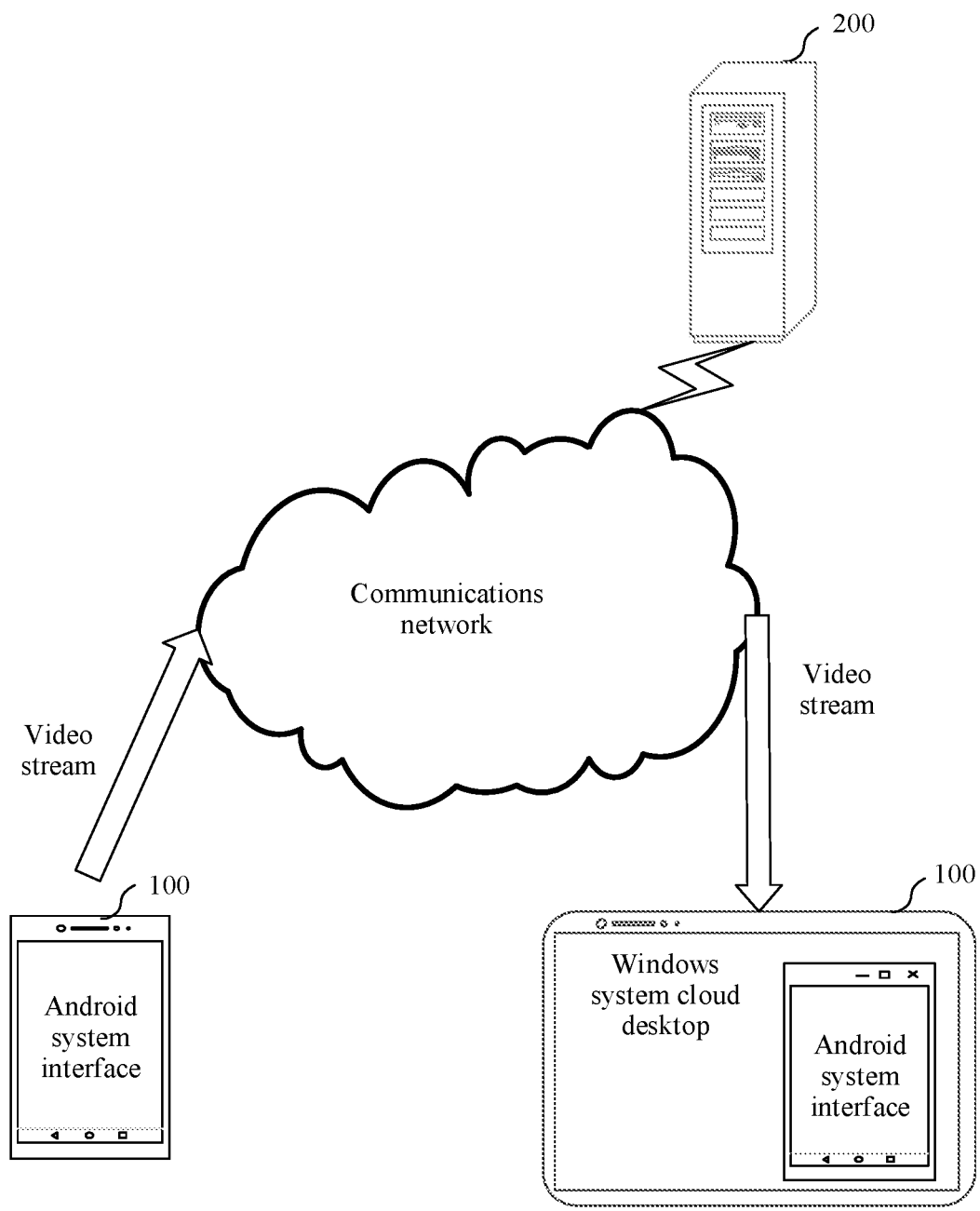
FIG. 10A and FIG. 10B are schematic flowcharts of a display method according to an embodiment of this application.

For the display method shown in FIG. 6, the electronic device implements display of the first interface and the second interface on a same screen in the following manner. Specifically, as shown in FIG. 10A, when the foldable screen of the electronic device is in the folded state, a desktop cloud virtual machine 200 establishes a connection to the electronic device 100 (that is, a desktop cloud client 100) by using a desktop protocol, and the desktop cloud virtual machine 200 transmits the cloud desktop interface of the first operating system (for example, the Windows system) to the electronic device 100 in real time by using the desktop protocol. The desktop cloud client 100 presents the cloud desktop interface on the display of the desktop cloud client 100. When the foldable screen of the electronic device 100 is in the unfolded state, the electronic device 100 is triggered to encode a desktop or an application interface of the Android operating system into a video stream, and send the video stream to the desktop cloud virtual machine 200 over a network. The desktop cloud virtual machine 200 encodes the video stream together with the cloud desktop interface of the Windows system into a video stream and sends the video stream to the electronic device 100. Therefore, display of two systems on a same screen can be implemented by using the foregoing method.

Figure 10B:
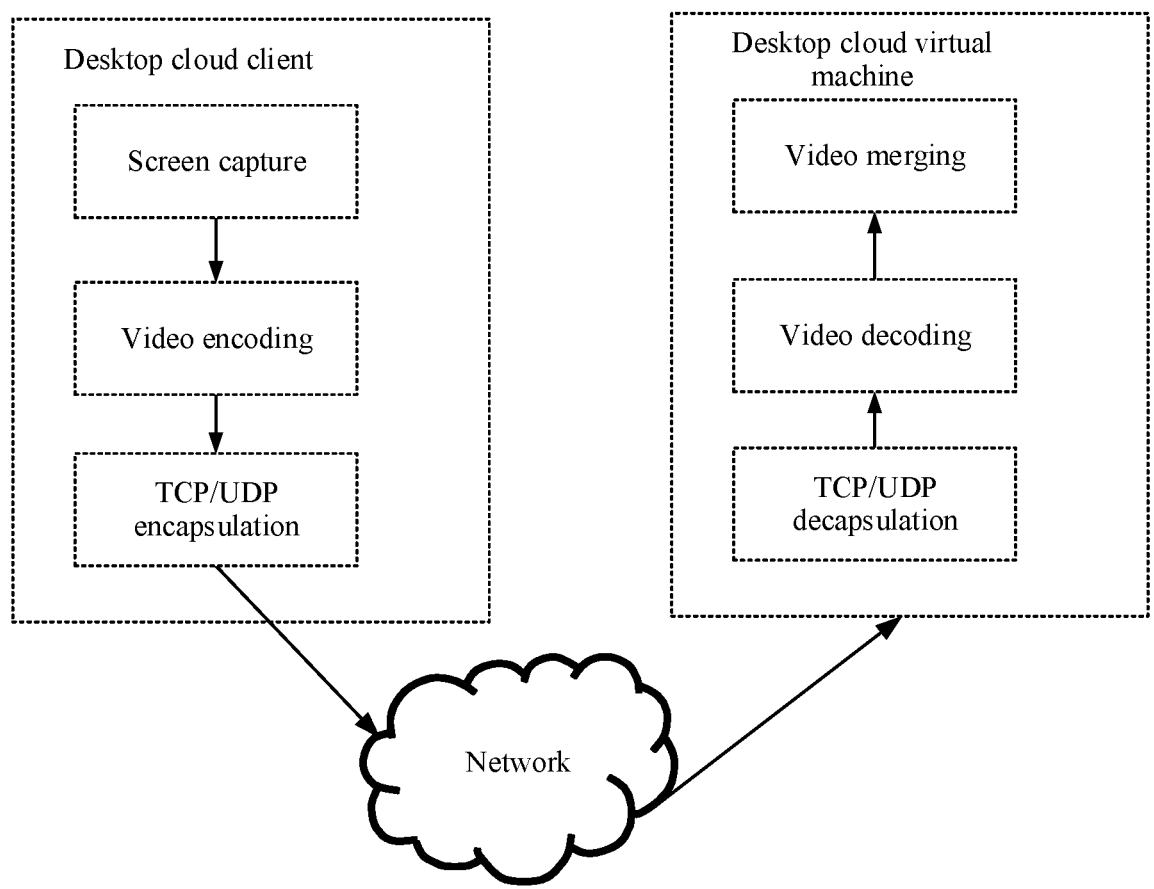

Specifically, as shown in FIG. 10B, the desktop cloud client 100 may capture a screen image that needs to be displayed, and then encode and compress the captured screen image and a capture time by using a video encoding technology, to form encoded and compressed screen capture information. Then TCP/UDP encapsulation is performed on the screen capture information to form a packet. The electronic device 100 sends the screen capture information to the desktop cloud virtual machine 200 based on an established IP connection, that is, sends the packet obtained through the TCP/UDP encapsulation. Correspondingly, the desktop cloud virtual machine 200 receives, through the IP connection, the packet sent by the electronic device 100, where the packet is the screen capture information obtained through the TCP/UDP encapsulation. After receiving the TCP/UDP packet, the desktop cloud virtual machine 200 may first perform TCP/UDP decapsulation, and then perform video decoding, to obtain the screen capture information from the received TCP/UDP packet. Then the cloud desktop interface and the screen capture information are encoded and merged into an audio/video stream and sent to the electronic device 100. After receiving the audio/video stream through the IP connection, the electronic device 100 performs video decoding and image rendering. The desktop cloud virtual machine may further receive an operation request from the desktop cloud client, where the operation request may be an input event of an input device such as a mouse or a keyboard. In response to the operation request, the desktop cloud virtual machine performs a corresponding operation. For example, the user double-clicks a mouse to play a multimedia file on the cloud desktop. The desktop cloud client transfers the request for playing the multimedia file to the desktop cloud virtual machine by using the desktop protocol.

Figure 11:
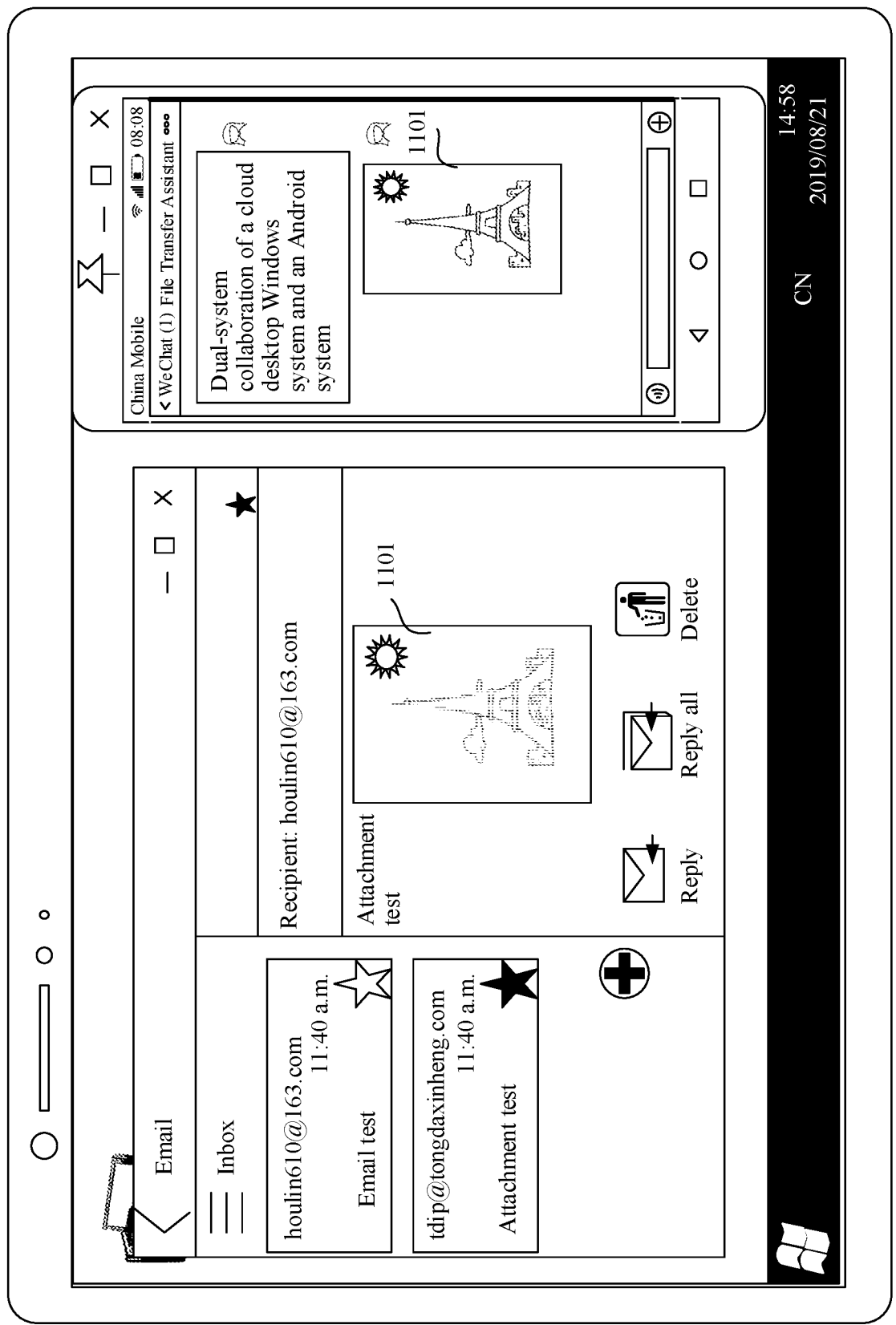
FIG. 11 is a schematic diagram of an interface according to an embodiment of this application.

In a possible embodiment, for the display methods shown in FIG. 6 and FIG. 8, the user may further copy displayed content in different interfaces of the display, to implement content interaction between different operating systems. For example, as shown in FIG. 11, a picture 1101 is received in a WeChat application of the Android system. The user may drag the picture 1101 out of the Android system, and drag the picture 1101 in an Email application of the cloud desktop. To be specific, the user may obtain, in the foregoing drag manner, the picture as an attachment in a process of sending an email by using the cloud desktop. Specifically, when the user performs the drag-out operation on the picture 1101 in the WeChat application in FIG. 11, the Android system sends a drag event to a collaborative interaction interface, and sends the drag event to a driver layer when the drag-out operation of the user is released. The driver layer obtains and stores data. In addition, the driver layer assembles the data into a drag parameter and invokes an interface to send the data to a WMS. Then an application framework sends the data to the first application of the cloud desktop.

It should be noted that the user may also drag content in the cloud desktop to the second interface corresponding to the Android system. A running environment of the electronic device includes but is not limited to systems such as Android, Linux, Windows, and iOS. An operating system of the cloud desktop virtual machine includes but is not limited to systems such as Windows and Linux.

Figure 12:
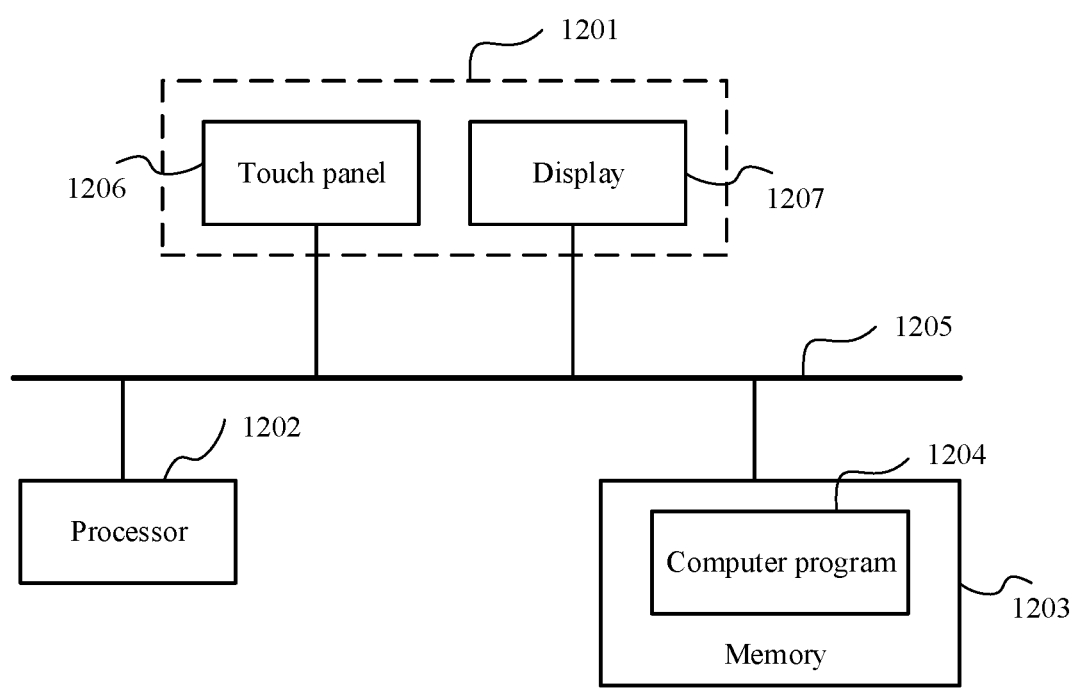
FIG. 12 is a schematic diagram of a structure of an electronic device according to an embodiment of this application.

In some other embodiments of this application, an electronic device is further disclosed. As shown in FIG. 12, the electronic device may include a touchscreen 1201 that includes a touch panel 1206 and a display 1207; one or more processors 1202; a memory 1203; one or more applications (not shown); and one or more computer programs 1204. The foregoing components may be connected by using one or more communications buses 1205. The one or more computer programs 1204 are stored in the memory 1203 and are executed by the one or more processors 1202. The one or more computer programs 1204 include instructions, and the instructions may be used to perform the steps in the embodiments corresponding to FIG. 6 or FIG. 8.

According to an embodiment of this application, a computer storage medium is further provided. The computer storage medium stores computer instructions. When the computer instructions are run on an electronic device, the electronic device is enabled to perform the related method steps to implement the display methods in the foregoing embodiments.

According to an embodiment of this application, a computer program product is further provided. When the computer program product is run on a computer, the computer is enabled to perform the foregoing related steps, to implement the display methods in the foregoing embodiments.

In addition, according to an embodiment of this application, an apparatus is further provided. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the touchscreen display methods in the foregoing method embodiments.

The electronic device, the computer storage medium, the computer program product, or the chip provided in the embodiments of this application may be all configured to perform the corresponding methods provided above. Therefore, for beneficial effects that can be achieved, refer to the beneficial effects of the corresponding methods provided above. Details are not described herein again.

Based on the foregoing descriptions of the implementations, a person skilled in the art may understand that for the purpose of convenient and brief descriptions, division of the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and methods may be implemented in other manners. For example, the described apparatus embodiment is merely an example. For example, division of the modules or units is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the apparatus or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk drive, a read only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application recited in the claims.

What is claimed is:

1. A display method, applied to an electronic device having a foldable screen, the method comprising:
   in response to the foldable screen being in a folded state, controlling the foldable screen to display a first interface of a first application, wherein the first interface is a cloud desktop interface of a first operating system; and
   in response to the foldable screen changing from the folded state to an unfolded state, controlling the foldable screen to simultaneously display the first interface and a second interface, wherein the second interface is an interface of a second operating system loaded by the electronic device;
   wherein the controlling the foldable screen to simultaneously display the first interface and the second interface further comprises:
   controlling the foldable screen to display the first interface in full screen; and
   controlling the second interface to be displayed within the first interface in a window form, wherein operations executed on the second interface are conducted within the window form without extending the second interface to the full screen.

2. The method according to claim 1, wherein controlling the foldable screen to simultaneously display the first interface and a second interface comprises:
   controlling a first display area of the foldable screen to display the first interface; and
   controlling a second display area of the foldable screen to display the second interface.

3. The method according to claim 2, wherein location information of the first display area and the second display area on the foldable screen is preconfigured by the electronic device.

4. The method according to claim 2, wherein location information of the first display area and the second display area on the foldable screen is set by a user of the electronic device.

5. The method according to claim 2, wherein the first display area is a display area corresponding to a first screen, and the second display area is a display area corresponding to a second screen, wherein the foldable screen comprises the first screen and the second screen.

6. The method according to claim 1, further comprising:
receiving a drag operation performed by a user on displayed content in the second interface; and
copying the displayed content to the first interface in response to the drag operation.

7. The method according to claim 1, further comprising:
receiving a drag operation performed by a user on displayed content in the first interface; and
copying the displayed content to the second interface in response to the drag operation.

8. The method according to claim 1, wherein the first operating system is Windows or Linux.

9. The method according to claim 8, wherein the second operating system is Android or iOS.

10. An electronic device, comprising:
a foldable screen;
a processor; and
a memory coupled to the processor, wherein
the memory stores program instructions; and
the processor is configured to execute the program instructions stored in the memory, to cause the electronic device to perform:
in response to the foldable screen being in a folded state, controlling the foldable screen to display a first interface of a first application, wherein the first interface is a cloud desktop interface of a first operating system; and
in response to the foldable screen changing from the folded state to an unfolded state, controlling the foldable screen to simultaneously display the first interface and a second interface, wherein the second interface is an interface of a second operating system loaded by the electronic device;
wherein the controlling the foldable screen to simultaneously display the first interface and the second interface further comprises:
controlling the foldable screen to display the first interface in full screen; and
controlling the second interface to be displayed within the first interface in a window form, wherein operations executed on the second interface are conducted within the window form without extending the second interface to the full screen.

11. The electronic device according to claim 10, wherein the processor is configured to execute the program instructions stored in the memory, to cause the electronic device to perform:
controlling a first display area of the foldable screen to display the first interface; and
controlling a second display area of the foldable screen to display the second interface.

12. The electronic device according to claim 11, wherein location information of the first display area and the second display area on the foldable screen is preconfigured by the electronic device.

13. The electronic device according to claim 11, wherein location information of the first display area and the second display area on the foldable screen is set by a user of the electronic device.

14. The electronic device according to claim 11, wherein the first display area is a display area corresponding to a first screen, and the second display area is a display area corresponding to a second screen, wherein the foldable screen comprises the first screen and the second screen.

15. The electronic device according to claim 10, wherein the processor is configured to execute the program instructions stored in the memory, to cause the electronic device to perform:
receiving a drag operation performed by a user on displayed content in the second interface; and
copying the displayed content to the first interface in response to the drag operation.

16. The electronic device according to claim 10, wherein the processor is configured to execute the program instructions stored in the memory, to cause the electronic device to perform:
receiving a drag operation performed by a user on displayed content in the first interface; and
copying the displayed content to the second interface in response to the drag operation.

17. The electronic device according to claim 10, wherein the first operating system is Windows or Linux, and the second operating system is Android or iOS.

18. A non-transitory computer-readable storage medium, wherein the computer-readable storage medium comprises a computer program, and when the computer program is executed by one or more processors on an electronic device having a foldable screen, causes the electronic device to perform:
in response to the foldable screen being in a folded state, controlling the foldable screen to display a first interface of a first application, wherein the first interface is a cloud desktop interface of a first operating system; and
in response to the foldable screen changing from the folded state to an unfolded state, controlling the foldable screen to simultaneously display the first interface and a second interface, wherein the second interface is an interface of a second operating system loaded by the electronic device;
wherein the controlling the foldable screen to simultaneously display the first interface and the second interface further comprises:
controlling the foldable screen to display the first interface in full screen; and
controlling the second interface to be displayed within the first interface in a window form, wherein operations executed on the second interface are conducted within the window form without extending the second interface to the full screen.

19. The non-transitory computer-readable storage medium according to claim 18, wherein controlling the foldable screen to simultaneously display the first interface and a second interface comprises:
controlling a first display area of the foldable screen to display the first interface; and
controlling a second display area of the foldable screen to display the second interface.

20. The non-transitory computer-readable storage medium according to claim 19, wherein location information of the first display area and the second display area on the foldable screen is preconfigured by the electronic device.

* * * * *